US012737287B2

(12) United States Patent
Sanchez Tan

(10) Patent No.: US 12,737,287 B2
(45) Date of Patent: Sep. 15, 2026

(54) MEMORY SYSTEM

(71) Applicant: Kioxia Corporation, Tokyo (JP)

(72) Inventor: Mel Stychen Sanchez Tan, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 19/072,581

(22) Filed: Mar. 6, 2025

(65) Prior Publication Data

US 2025/0383982 A1 Dec. 18, 2025

(30) Foreign Application Priority Data

Jun. 13, 2024 (JP) ................................ 2024-095896

(51) Int. Cl.
*G06F 12/02* (2006.01)

(52) U.S. Cl.
CPC ................................ *G06F 12/0246* (2013.01)

(58) Field of Classification Search
CPC ................................................ G06F 12/0246
See application file for complete search history.

(56) References Cited

U.S. PATENT DOCUMENTS

2017/0212680 A1* 7/2017 Waghulde ............... G06F 3/061
2019/0087327 A1 3/2019 Kanno
2022/0291838 A1* 9/2022 Gorobets ............... G06F 3/064
2023/0019966 A1 1/2023 Sabol
2023/0152973 A1* 5/2023 Hwang .............. G06F 12/0246 711/103
2024/0012580 A1 1/2024 Helmick
2024/0028231 A1* 1/2024 Bert ..................... G06F 3/0656

FOREIGN PATENT DOCUMENTS

TW I644211 B 12/2018

* cited by examiner

*Primary Examiner* — Prasith Thammavong
(74) *Attorney, Agent, or Firm* — Kim & Stewart LLP

(57) ABSTRACT

A memory system that can effectively use resources includes a nonvolatile memory that includes a plurality of physical blocks and a controller. The controller manages a plurality of superblocks that each include one or more physical blocks among the plurality of physical blocks, and notifies a host of a maximum size among data sizes writable in each of the superblocks, as a first size that is a size of a reclaim unit. Upon receipt of one or more write commands from the host, the one or more write commands designating a first reclaim unit having the first size, the controller writes a first data portion of the first reclaim unit into the first superblock to fill the entire first superblock and then a second data portion of the first reclaim unit into the second superblock.

20 Claims, 19 Drawing Sheets

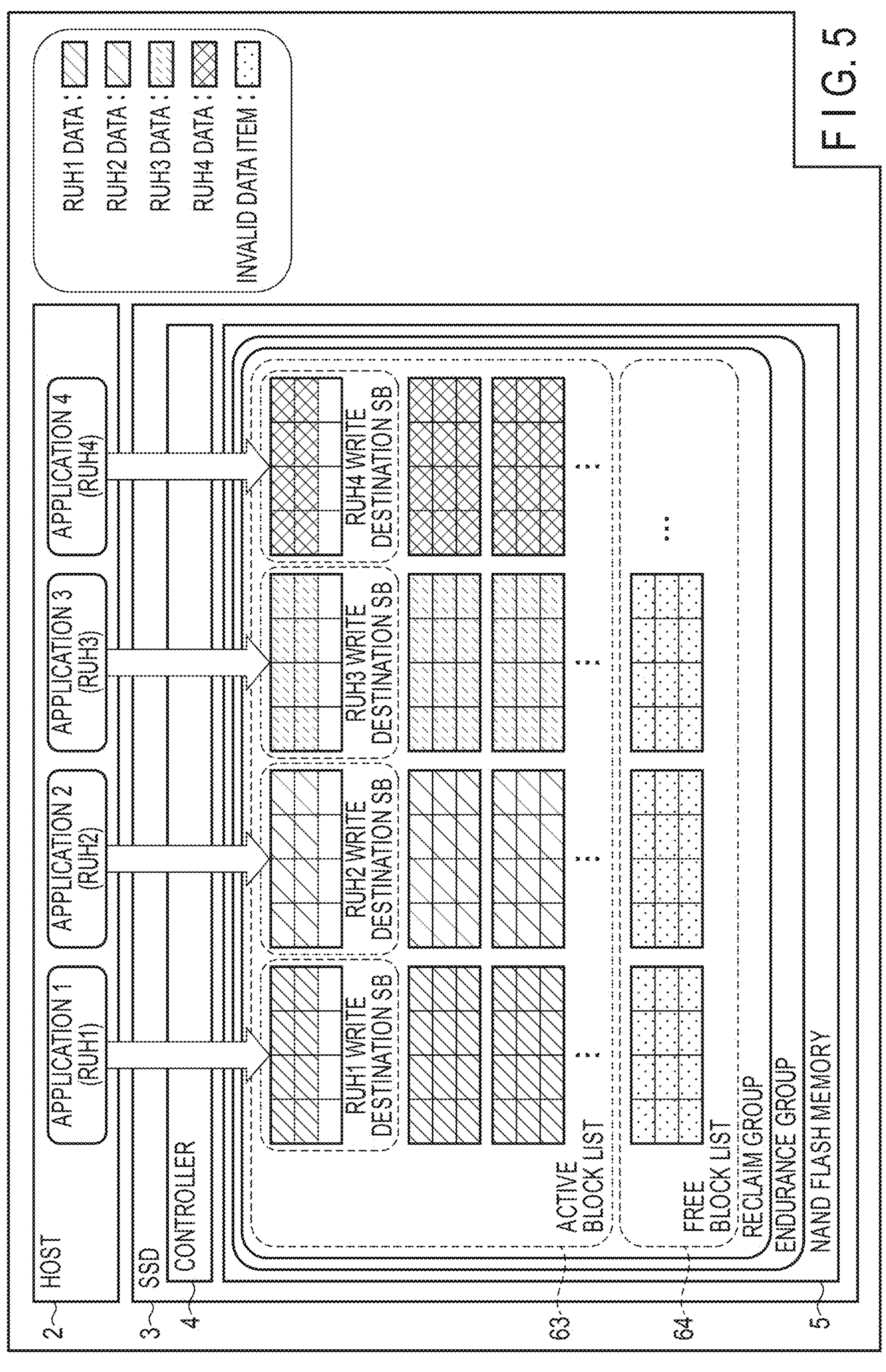
F I G. 5

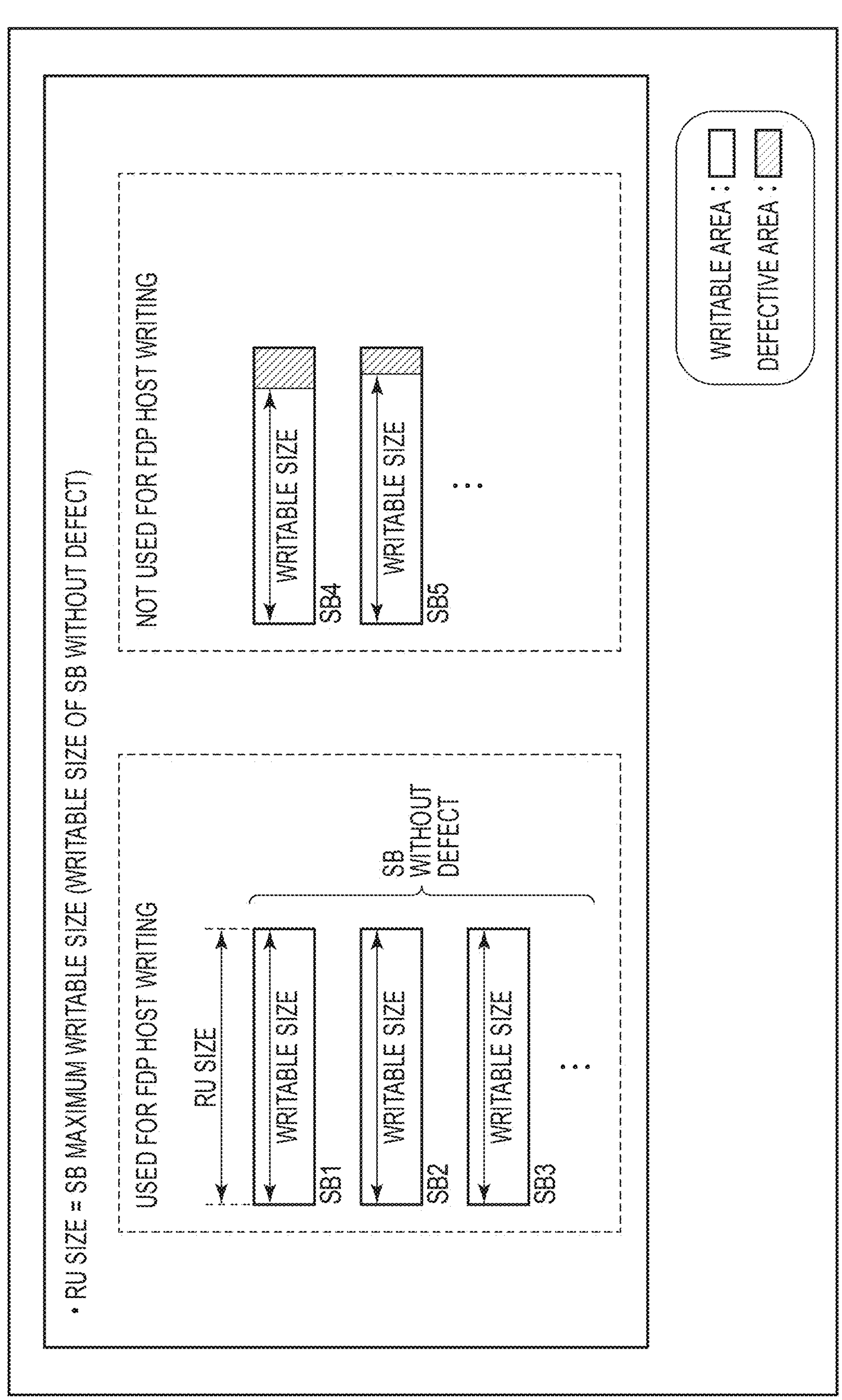
F I G. 7

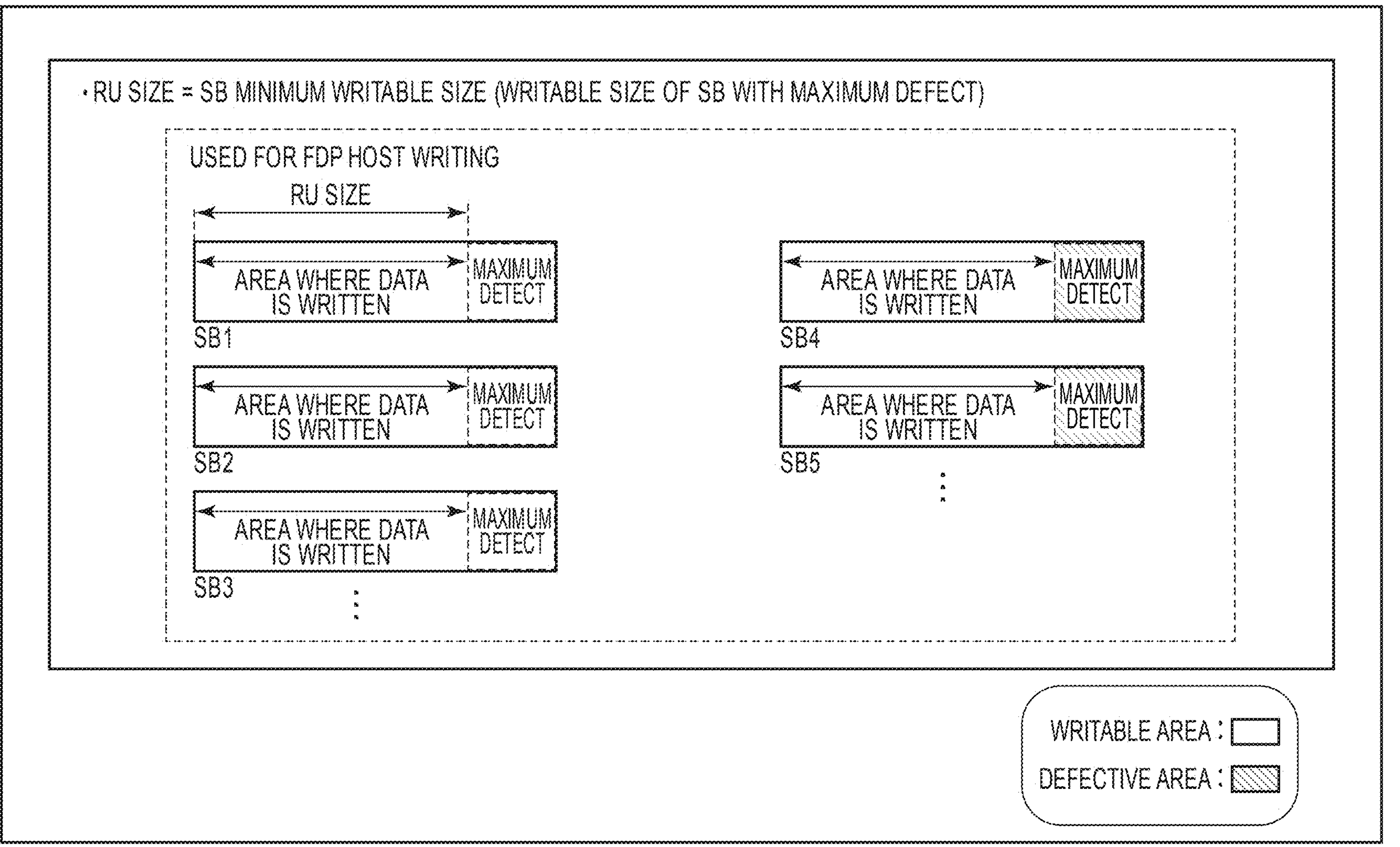
F I G. 8

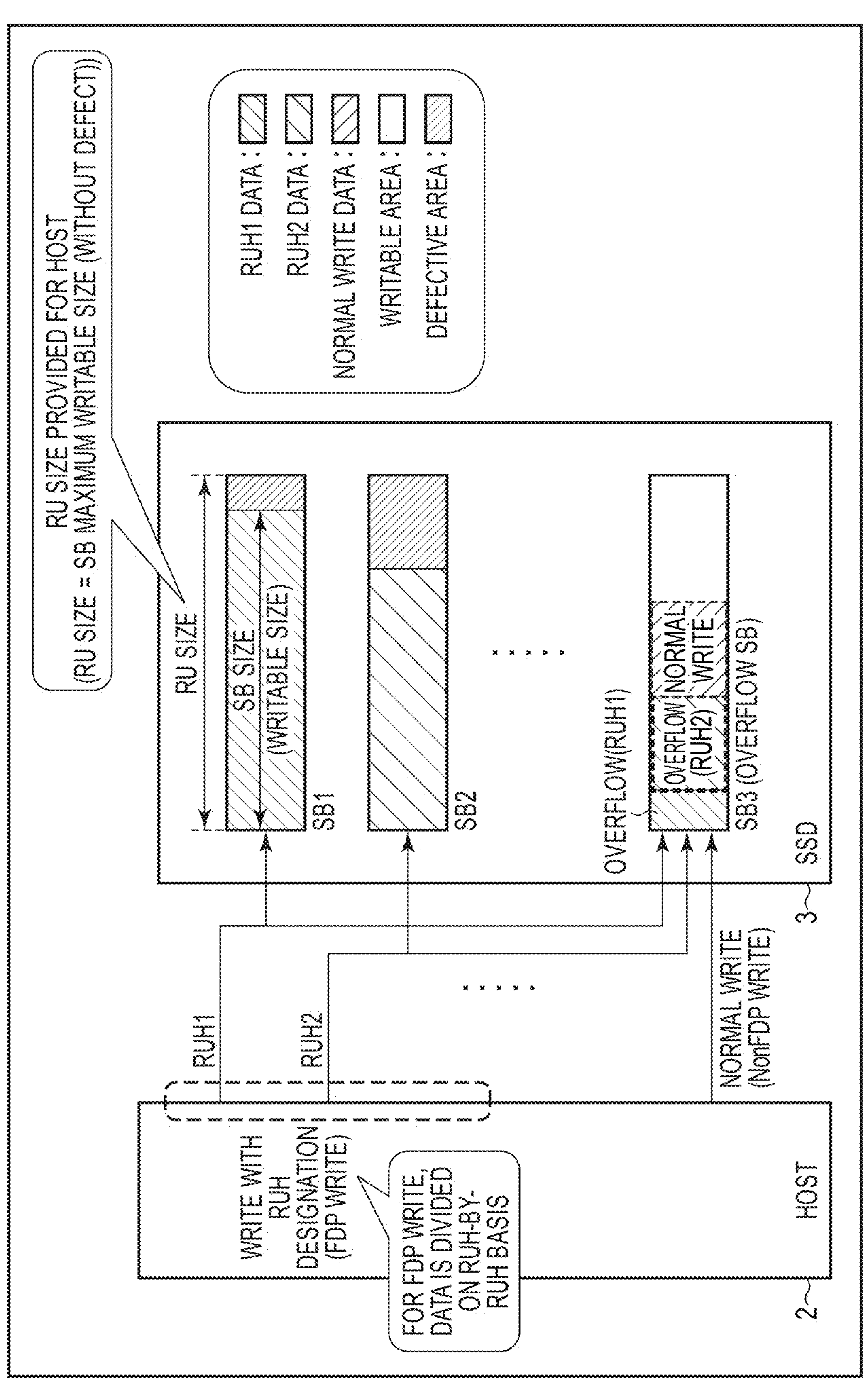
F I G. 9

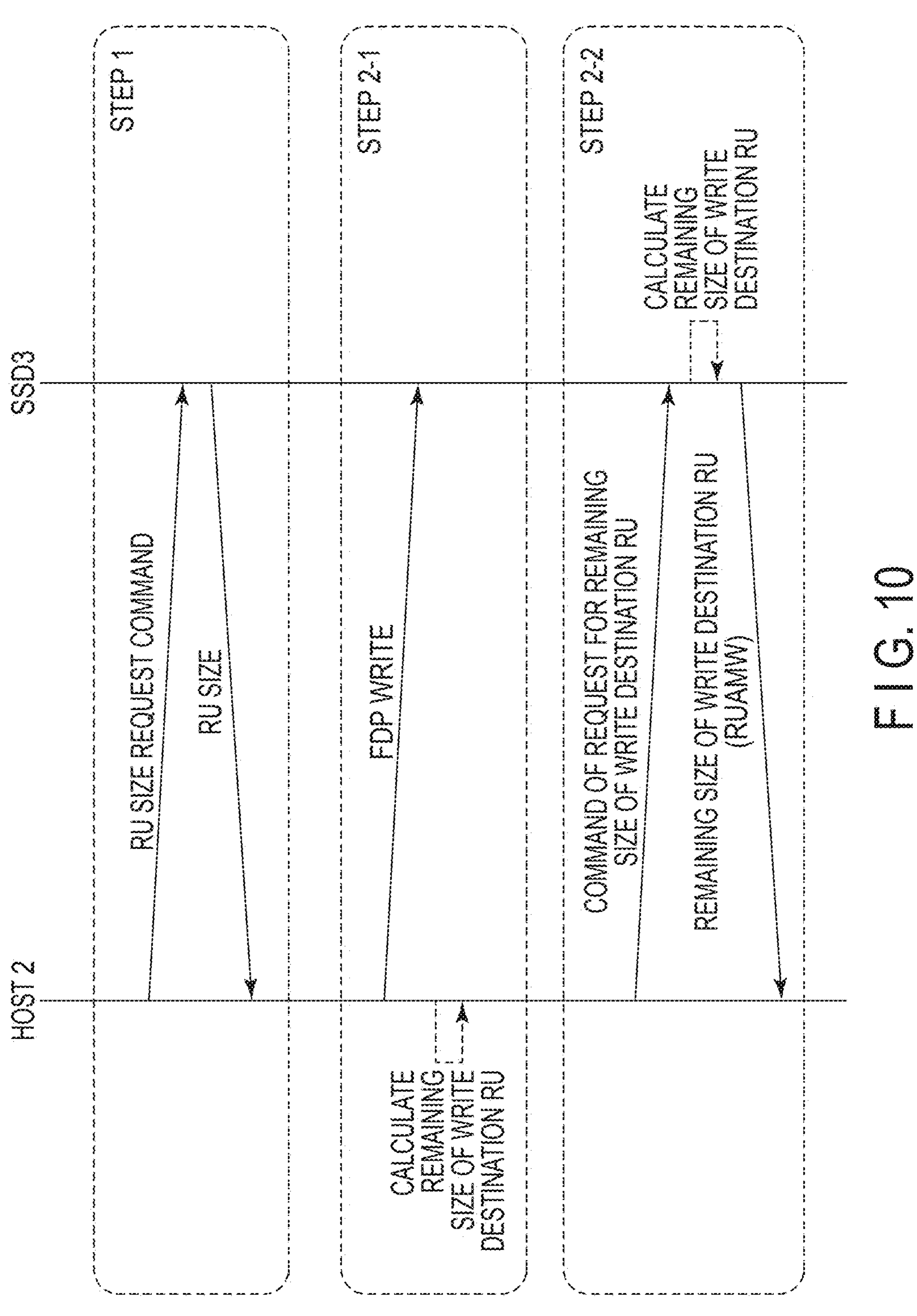
F I G. 10

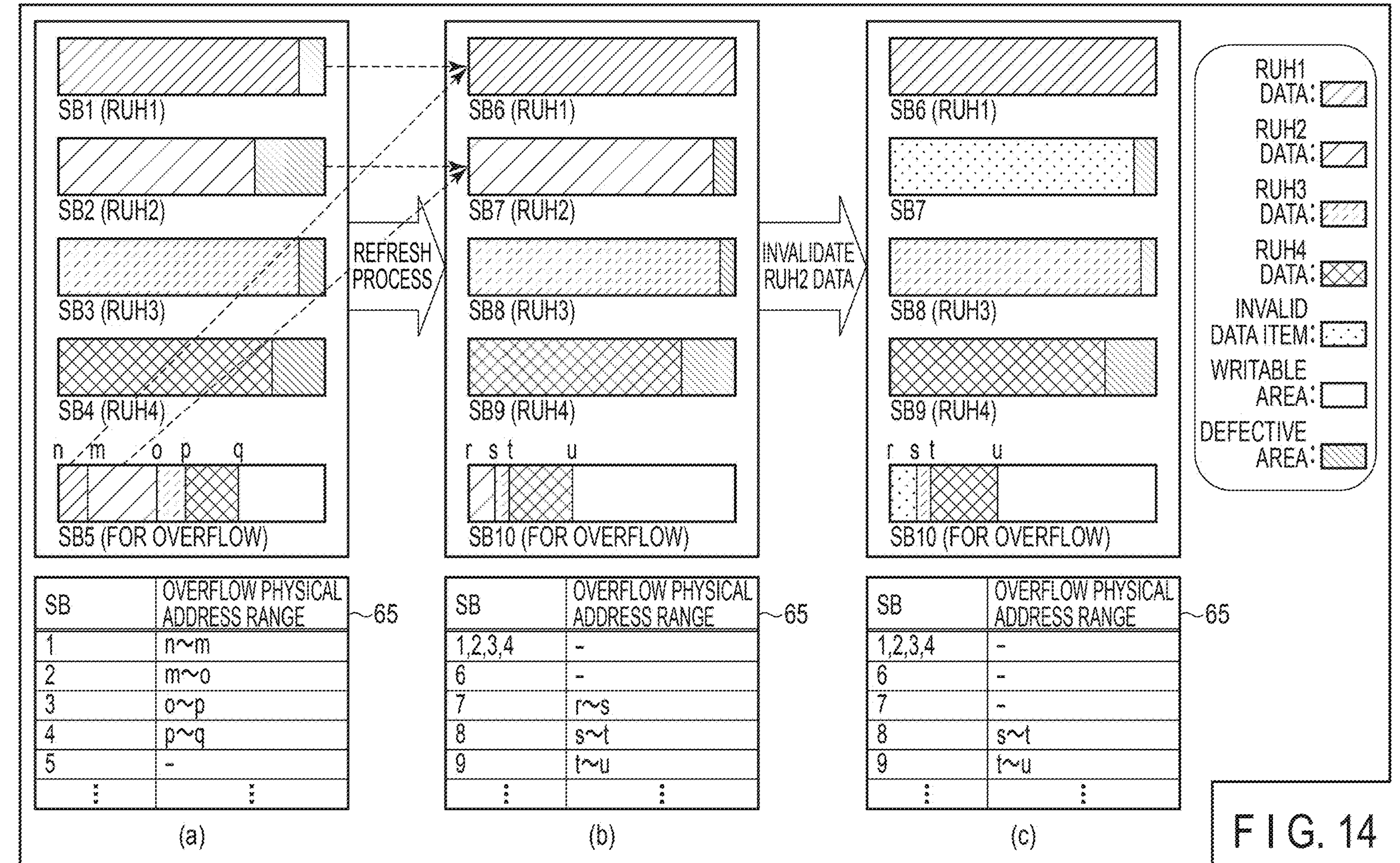
F I G. 14

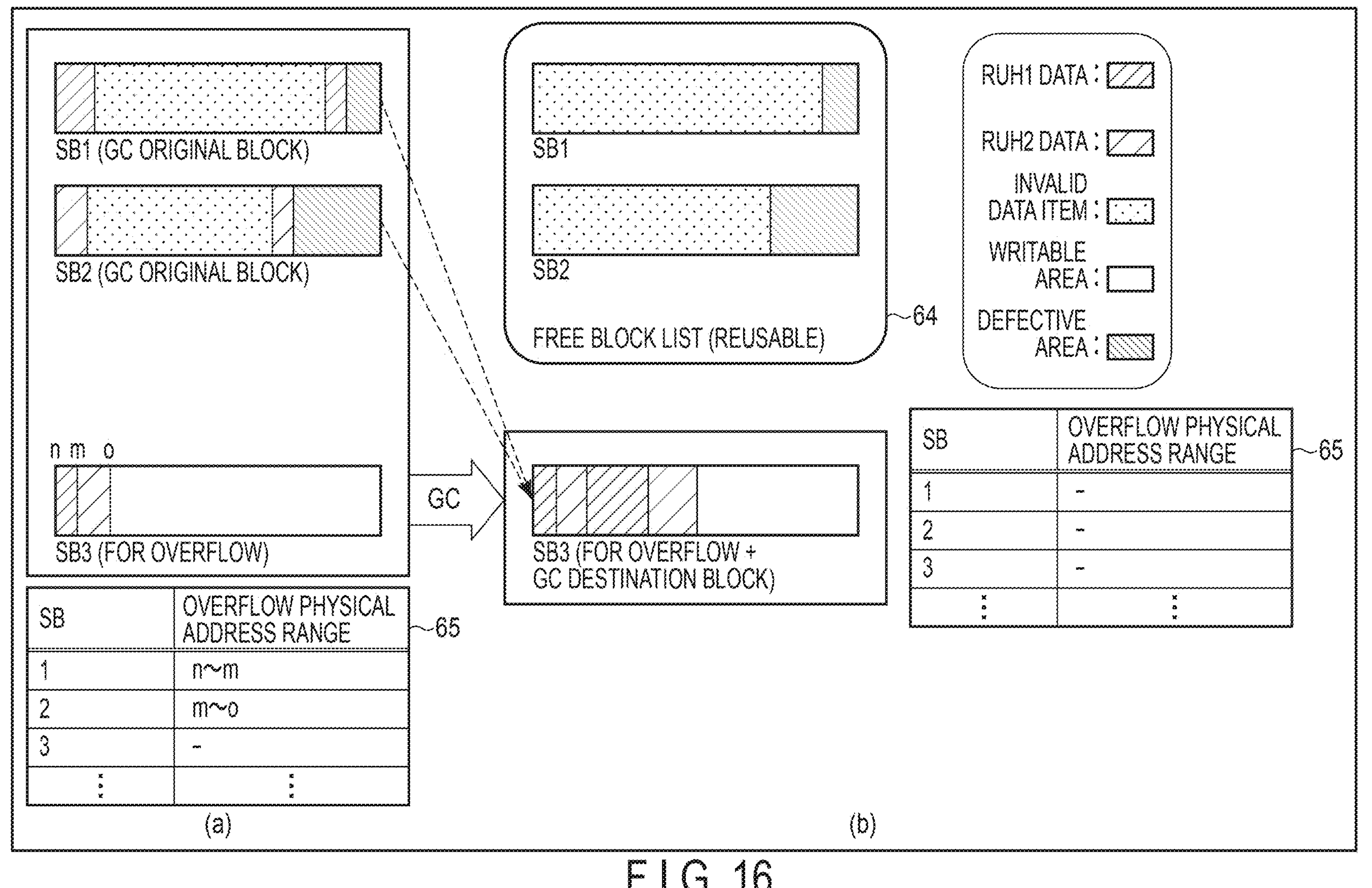
F I G. 16

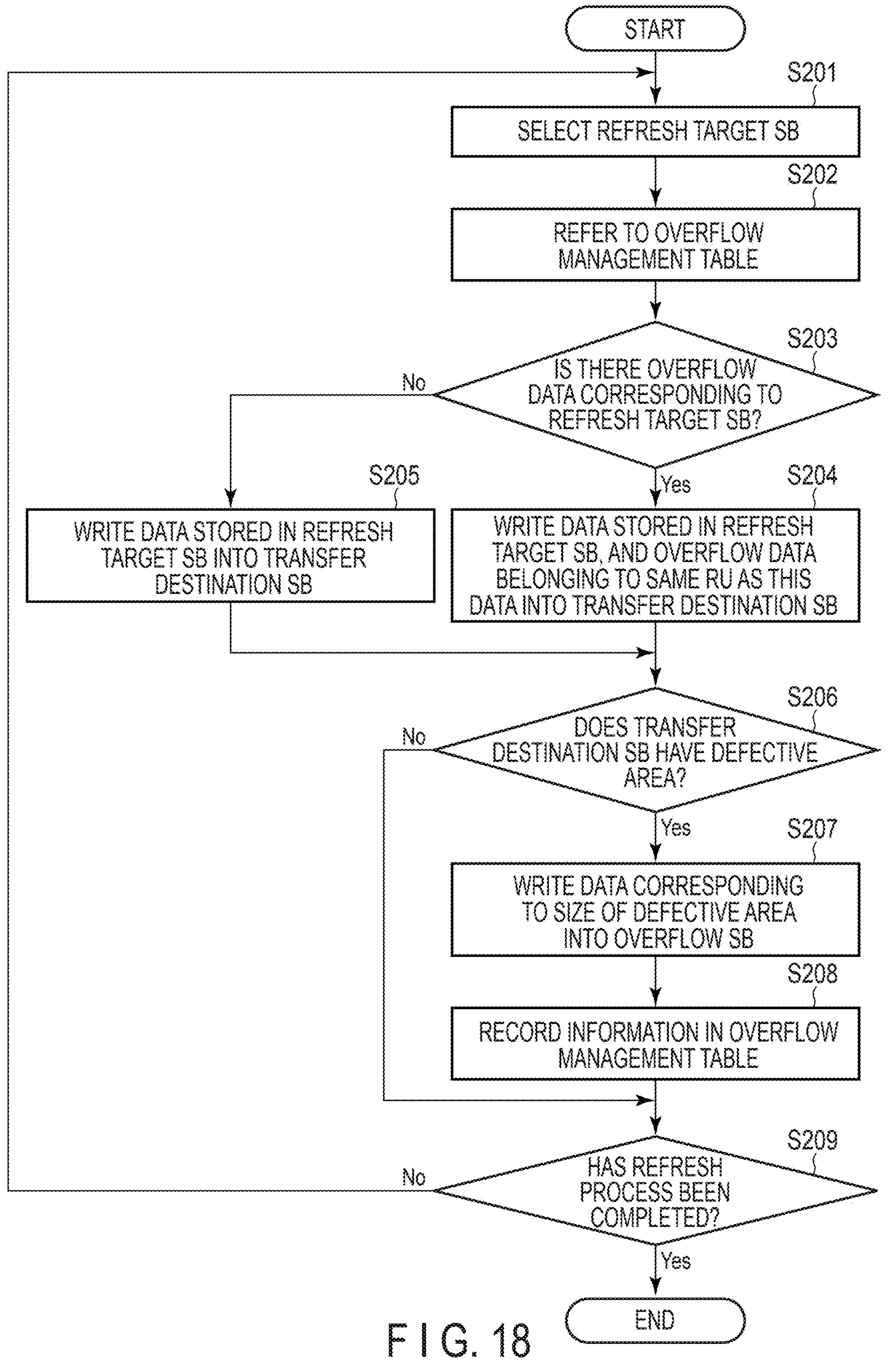
F I G. 18

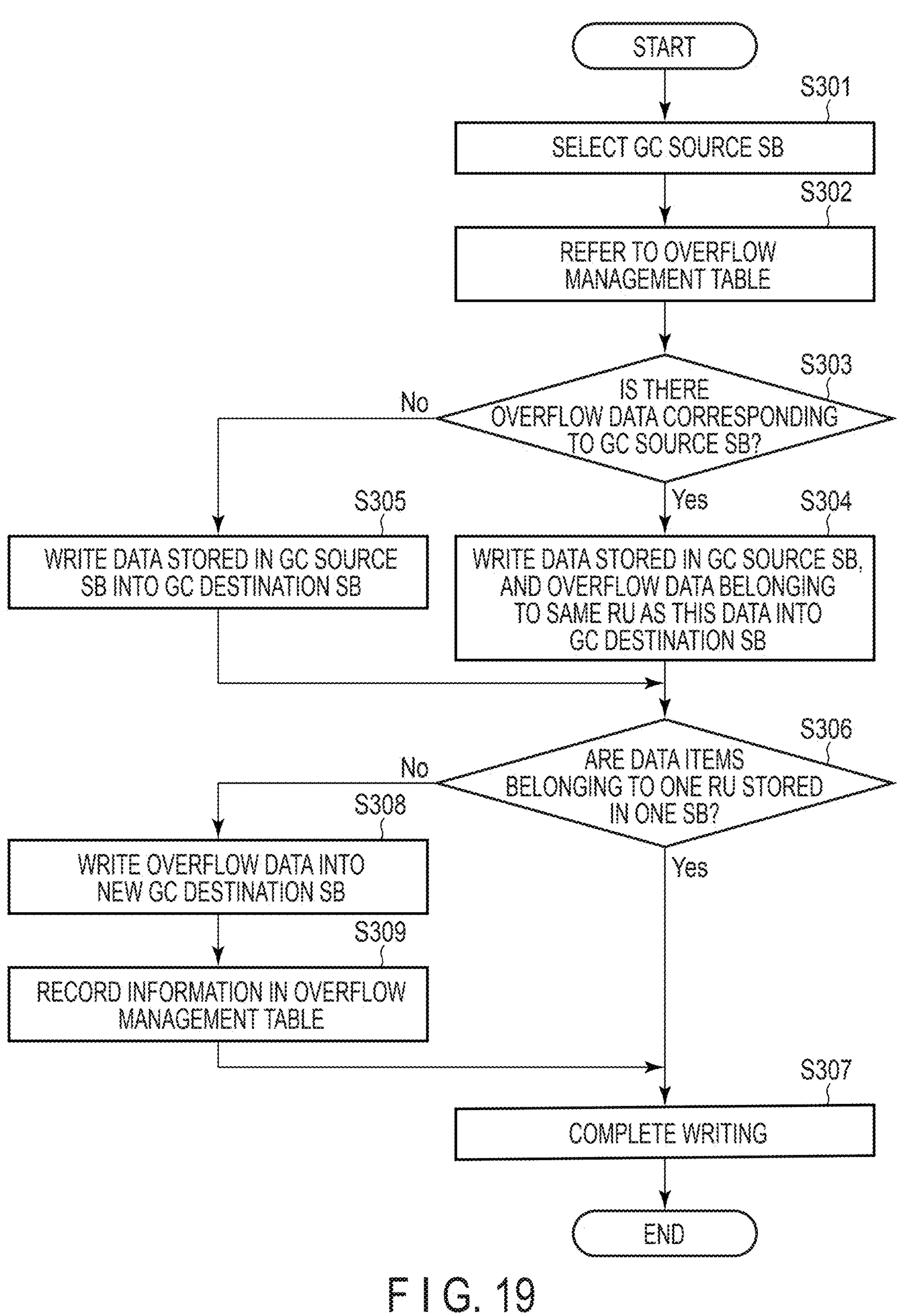
F I G. 19

MEMORY SYSTEM

CROSS-REFERENCE TO RELATED APPLICATION(S)

This application is based upon and claims the benefit of priority from Japanese Patent Application No. 2024-095896, filed Jun. 13, 2024, the entire contents of which are incorporated herein by reference.

FIELD

Embodiments described herein relate generally to a technique of controlling a nonvolatile memory.

BACKGROUND

In recent years, memory systems that include nonvolatile memories are widespread. As one of such memory systems, a solid state drive (SSD) that includes a NAND flash memory is known.

The SSD can use a superblock (also called a logical block or a block group) made up of a plurality of physical blocks, as a unit of a data erase process. The aggregate size of data that is writable in the superblock changes depending on whether any of the physical blocks constituting the superblock is a defective block or not. That is, the sizes of the superblocks in the SSD can be different sizes. The SSD uses superblocks, and can thereby achieve improvement in performance and the like due to parallel operation of a plurality of physical blocks constituting each superblock. Meanwhile, in a case where a host issues write commands for writing multiple types of data, different types of data are present in one superblock in a mixed manner.

To address this, it is conceivable to set logical segments depending on the types of data, and allocate write destination superblocks depending on the respective set segments. Here, the logical segments allocated to the superblocks respectively have fixed sizes defined between the host and the SSD.

It is required to effectively allocate superblocks that can have different sizes respectively to the fixed-size logical segments.

BRIEF DESCRIPTION OF THE DRAWINGS

FIG. 5 illustrates data writing conforming to Flexible Data Placement (FDP), which is executed in the information processing system that includes the memory system according to the embodiment.

FIG. 7 illustrates the relationship between a superblock and a reclaim unit (RU) size managed in a memory system according to a first comparative example.

FIG. 8 illustrates the relationship between a superblock and a RU size managed in a memory system according to a second comparative example.

FIG. 9 shows a write destination superblock in the memory system according to the embodiment.

FIG. 10 is a sequence diagram illustrating RU size management in the memory system according to the embodiment.

FIG. 14 shows an example of a refresh process executed in the memory system according to the embodiment.

FIG. 16 shows a second example of the garbage collection process executed in the memory system according to the embodiment.

FIG. 18 is a flowchart showing procedures of a refresh process executed in the memory system according to the embodiment.

FIG. 19 is a flowchart showing procedures of the garbage collection process executed in the memory system according to the embodiment.

DETAILED DESCRIPTION

Figure 1:
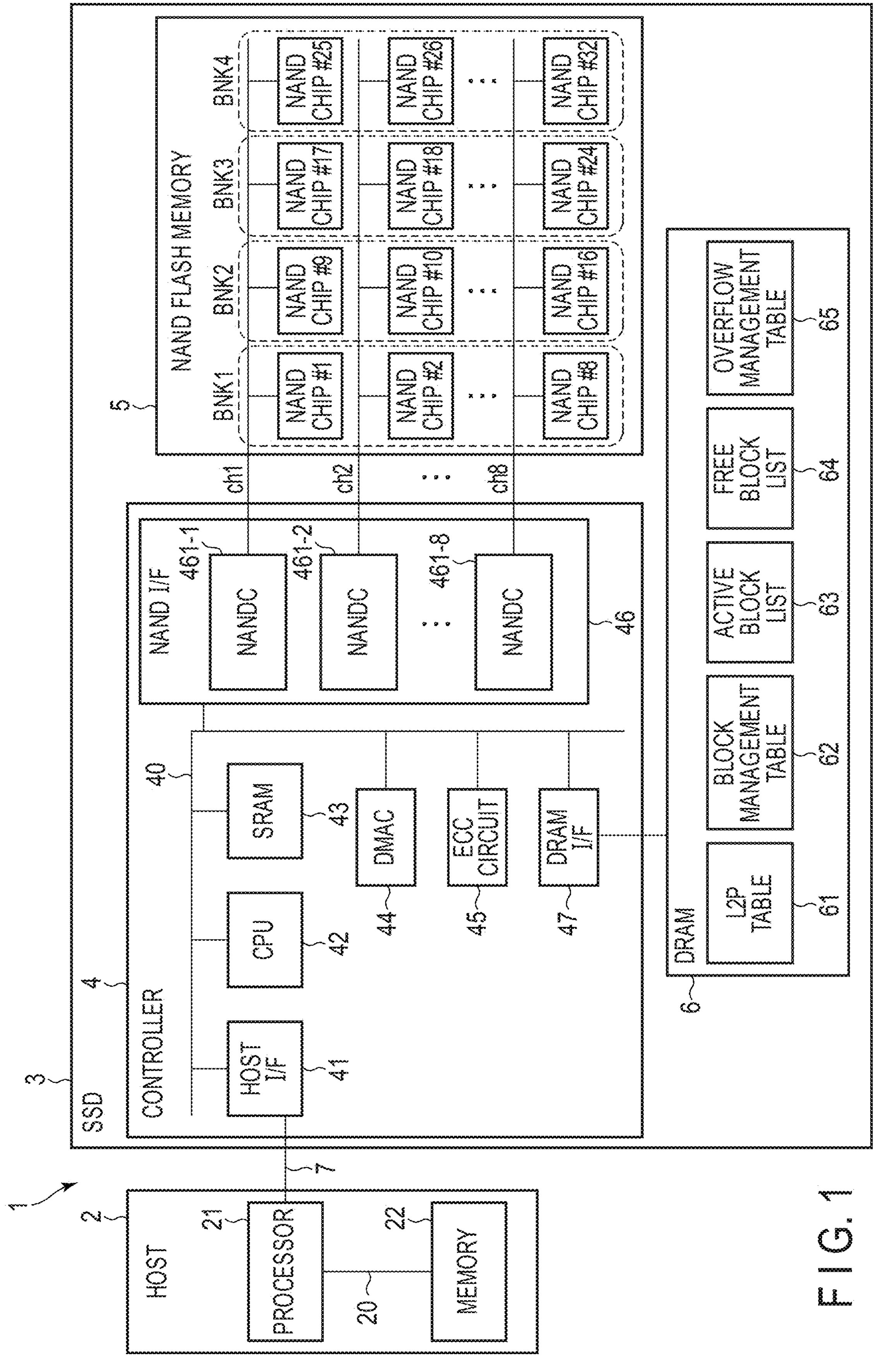
FIG. 1 is a block diagram showing a configuration example of an information processing system that includes a memory system according to an embodiment.

One embodiment of the present invention provides a memory system that can effectively use resources.

In general, according to one embodiment, a memory system is connectable to a host. The memory system includes a nonvolatile memory, and a controller. The nonvolatile memory includes a plurality of physical blocks each serving as a unit of a data erase operation. The controller is electrically connected to the nonvolatile memory. The controller manages a plurality of superblocks that each include one or more physical blocks among the plurality of physical blocks and include at last a first superblock and a second superblock. The controller notifies the host of a maximum size among data sizes writable in each of the plurality of superblocks, as a first size that is a size of a reclaim unit. Upon receipt of one or more write commands from the host, the one or more write commands designating a first reclaim unit having the first size, the controller writes a first data portion of the first reclaim unit into the first superblock to fill the entire first superblock and then a second data portion of the first reclaim unit into the second superblock.

Hereinafter, referring to the drawings, the embodiment is described.

The configuration of an information processing system that includes a memory system according to the embodiment is described. FIG. 1 is a block diagram showing a configuration example of an information processing system 1 that includes a memory system 3 according to the embodiment.

The information processing system 1 includes a host (host device) 2 and the memory system 3.

The host 2 is an information processing apparatus configured to control the memory system 3. Examples of the host 2 include a personal computer, a server computer, a mobile terminal, or a vehicle-mounted device.

The memory system 3 is a semiconductor storage device configured to write data into a nonvolatile memory and read data from the nonvolatile memory. The memory system 3 can be realized as, for example, a solid state drive (SSD). Hereinafter, an example where the memory system 3 is realized as an SSD is described. Hereinafter, the memory system 3 is called an SSD 3.

Communication between the host 2 and the SSD 3 is executed via a bus 7. The bus 7 is a transmission path that connects the host 2 and the SSD 3 to each other. The bus 7 is, for example, a PCI Express™ (PCIe™) bus. The PCIe bus is a full duplex transmission path. The full duplex transmission path includes both a transmission path to transmit data and input-and-output (I/O) commands from the host 2 to the SSD 3, and a transmission path to transmit data and responses from the SSD 3 to the host 2. Each I/O command is a command for writing data into a nonvolatile memory, or a command for reading data from the nonvolatile memory. The I/O command may be, for example, a write command or a read command.

The write command is a command that issues a request for writing data into the SSD 3. The write command includes information that indicates a start logical address, the size of data (write data) associated with the write command, and a data pointer. The start logical address is a logical address of the beginning of a logical address range corresponding to the write data. For example, a logical block address (LBA) is used as the logical address. The size of the write data is represented by, for example, the number of LBAs (the number of sectors) included in the logical address range corresponding to the write data. The data pointer is an address that indicates the storage position in a memory 22 of the host 2 where the write data is stored.

The read command is a command that issues a request for reading data from the SSD 3. The read command includes information that indicates a start logical address, the size of data (read data) to be read, and a data pointer. The start logical address is a logical address of the beginning of a logical address range corresponding to the read data. The size of the read data is represented by the number of LBAs (the number of sectors) included in the logical address range corresponding to the read data. The data pointer is an address that indicates the storage position in the memory 22 of the host 2 where the read data is to be transferred.

For example, the NVM Express™ (NVMe™) standard is used as a standard of the logical interface for connecting the host 2 and the SSD 3 to each other. Through the interface of the NVMe standard, communication between the host 2 and the SSD 3 is performed using a pair of queues that include at least one submission queue (SQ) and a completion queue (CQ) associated with the at least one submission queue (SQ). The pair of queues is called a submission queue/completion queue pair (SQ/CQ pair).

When the host 2 issues an I/O command to the SSD 3, it stores the I/O command to be issued, in the submission queue (SQ). The SSD 3 then accesses the submission queue (SQ), and fetches the I/O command, thus receiving the I/O command. Upon completion of the process pertaining to the received command, the SSD 3 stores a completion response corresponding to the processed command in the completion queue (CQ). The completion response includes, for example, information indicating that the process pertaining to the corresponding command has been completed. The host 2 recognizes that the process pertaining to the issued command has been completed, by processing the completion response stored in the completion queue (CQ).

When the host 2 and the SSD 3 support the Flexible Data Placement (FDP), which is a feature of the NVMe standard, the host 2 may issue a write command that includes information designating a Reclaim Unit (RU) that is the write destination of data.

The RU is a data management unit designated by the host 2. The RU can also be called a logical segment. Data belonging to one RU is associated with a plurality of LBAs. The RU is used by the host 2, as a unit that allows data to be erased/reused without interfering with other RUs. The size of a RU is notified by the SSD 3 to the host 2. For example, in the SSD 3, one superblock can be allocated to each RU. The superblock is used as a unit of the data erase process in the SSD 3. The details of the superblock are described later.

A write command conforming to the FDP includes a Reclaim Unit Handle (RUH) as information for designating a write destination RU. The SSD 3 can associate a plurality of RUs with one RUH, and manage them. Note that the number of RUs in an open state among the RUs associated with one RUH is one. The open state is a state where data can be written. Accordingly, by designating one RUH, one RU in the open state corresponding to this RUH is designated as the write destination RU. The SSD 3 having received the write command determines the RU that is the write destination of write data, based on the RUH included in the received write command. A specific example of the write process of the write data in conformity with the FDP executed in the SSD 3 is described later.

In summary, in the data write process conforming to the FDP, the write destination superblock is designated based on the RUH included in the write command. Accordingly, the host 2 designates different RUHs depending on the types of data to be written into the SSD 3, thereby allowing write destination superblocks to be distinguished depending on the types of data. Consequently, when a specific type of data is no longer required, in the SSD 3, the data erase process can be executed only for the superblock that stores the specific type of data. The SSD 3 can then reuse the superblock having been subjected to the data erase process, for allowing new data to be written therein.

Next, a configuration example of the host 2 is described.

The host 2 includes a processor 21, and the memory 22. The processor 21 and the memory 22 are connected to each other via a bus 20.

The processor 21 is, for example, a central processing unit (CPU). The processor 21 executes software (host software) loaded in the memory 22. The host software is loaded into the memory 22 from the SSD 3 or another storage device connected to the host 2. The host software includes an operating system, a file system, device drivers, and application programs. The processor 21 can execute a plurality of applications.

The memory 22 is, for example, a volatile memory. The memory 22 can also be called a main memory, a system memory, or a host memory. The memory 22 is, for example, a random access memory, such as a dynamic random access memory (DRAM). Part of the storage area of the memory 22 is used as a data buffer. Write data to be written into the SSD 3 by the host 2, or read data transferred from the SSD 3, is stored in the data buffer.

Next, a configuration example of the SSD 3 is described.

The SSD 3 includes a controller 4, a NAND flash memory 5, and a DRAM 6.

The controller 4 is a memory controller that controls the NAND flash memory 5. The controller 4 may be realized by a circuit, such as system-on-a-chip (SoC). The controller 4 is electrically connected to the NAND flash memory 5.

The NAND flash memory 5 is a nonvolatile semiconductor memory. The NAND flash memory 5 includes a plurality of NAND chips. Each NAND chip is also called, for example, a memory chip, a flash die, or a memory die. Each NAND chip includes a memory cell array that includes a plurality of memory cells arranged in a matrix manner. The NAND flash memory 5 may be a flash memory that has a two-dimensional structure, or a flash memory that has a three-dimensional structure.

The DRAM 6 is a volatile memory. A storage area of the DRAM 6 is used to store, for example, information for managing the SSD 3. Part of the storage area of the DRAM 6 may be used to temporarily store data to be written into the NAND flash memory 5, or data read from the NAND flash memory 5.

The controller 4 includes a host interface circuit (host I/F) 41, a CPU 42, a static RAM (SRAM) 43, a direct memory access controller (DMAC) 44, an ECC circuit 45, a NAND interface circuit (NAND I/F) 46, and a DRAM interface circuit (DRAM I/F) 47. The host I/F 41, the CPU 42, the SRAM 43, the DMAC 44, the ECC circuit 45, the NAND I/F 46, and the DRAM I/F 47 are connected to each other via an internal bus 40.

The host I/F 41 is an interface circuit configured to execute communication with the host 2. The host I/F 41 is, for example, a PCIe controller. The host I/F 41 receives various commands from the host 2. These commands are, for example, NVMe commands defined by the NVMe standard. The commands received from the host 2 include, for example, a trim command for invalidating data, besides the I/O commands (the write command and the read command) described above.

The CPU 42 is a processor. The CPU 42 controls the host I/F 41, the SRAM 43, the DMAC 44, the ECC circuit 45, the NAND I/F 46, and the DRAM I/F 47. In response to the boot-up of the SSD 3, the CPU 42 loads a control program (firmware) into the SRAM 43 from the NAND flash memory 5 or a ROM (not shown). The CPU 42 then executes the loaded firmware, thus performing various processes. Note that the firmware may be loaded into the DRAM 6 instead of the SRAM 43. The CPU 42 can execute command processes and the like for processing various commands from the host 2. The operation of the CPU 42 is controlled by the firmware described above. Note that part, some, or all of the command processes may be executed by a dedicated hardware in the controller 4.

The SRAM 43 is a volatile memory. Part of the storage area of the SRAM 43 is used as a working area of the CPU 42. Another part of the storage area of SRAM 43 may be used as a data buffer where data to be written into the NAND flash memory 5, or data read from the NAND flash memory 5 is temporarily stored.

The DMAC 44 is a circuit that executes direct memory access (DMA). The DMAC 44 executes data transfer between the memory 22 of the host 2 and the SRAM 43 or the DRAM 6.

The ECC circuit 45 executes an encoding process or a decoding process. When data is written into the NAND flash memory 5, the ECC circuit 45 executes the encoding process. In the encoding process, the ECC circuit 45 adds redundancy code (parity) to data to be written into the NAND flash memory 5. The redundancy code is, for example, an error correction code (ECC). When data is read from the NAND flash memory 5, the ECC circuit 45 executes the decoding process. In the decoding process, the ECC circuit 45 executes error correction of data read from the NAND flash memory 5. In execution of error correction, the ECC circuit 45 uses the ECC added to the data.

The NAND I/F 46 is a circuit that controls the NAND flash memory 5 under control of the CPU 42. The NAND I/F 46 is electrically connected to the plurality of NAND chips included in the NAND flash memory 5.

The plurality of NAND chips can independently operate. Accordingly, each NAND chip functions as a unit allowing parallel operation. The NAND I/F 46 includes, for example, NAND controllers (NANDC) 461-1, 461-2, . . . , and 461-8. The NANDC 461-1, 461-2, . . . , and 461-8 are respectively connected to channels ch1, ch2, . . . , and ch8. The NANDC 461-1, 461-2, . . . , and 461-8 are each connected to one or more NAND chips through the corresponding channels. FIG. 1 shows a case where four NAND chips are connected to each of the channels ch1, ch2, . . . , and ch8, as an example. In this case, the NANDC 461-1 is connected to NAND chips #1, #9, #17, and #25 via the channel ch1. The NANDC 461- 2 is connected to NAND chips #2, #10, #18, and #26 via the channel ch2. Likewise, the NANDC 461-8 is connected to NAND chips #8, #16, #24, and #32 via the channel ch8. The NAND chips #1, #2, . . . , and #8 are treated as a bank BNK1 by the controller 4. The NAND chips #9, #10, . . . , and #16 are treated as a bank BNK2 by the controller 4. The NAND chips #17, #18, . . . , and #24 are treated as a bank BNK3 by the controller 4. The NAND chips #25, #26, . . . , and #32 are treated as a bank BNK4 by the controller 4. The bank is a unit of causing the NAND chips to perform parallel operation by an interleaved operation.

In the configuration of the NAND flash memory 5 shown in FIG. 1, the controller 4 can access the NAND chips #1 to #32 in parallel through the eight channels and a bank-interleaved operation. Accordingly, the controller 4 can execute data writing and reading to or from the 32 NAND chips at the maximum, in parallel. In this case, the number of parallel accesses is 32. Note that each of the NAND chips #1 to #32 may have a multi-plane structure that includes a plurality of planes. For example, in a case where each of the NAND chips #1 to #32 includes two planes, the controller 4 can execute data writing or reading to or from 64 planes at the maximum, in parallel. In this case, the number of parallel accesses is 64.

The DRAM I/F 47 is a circuit configured to control the DRAM 6 under control of the CPU 42.

Part of the storage area of the DRAM 6 can be used to store information for managing the SSD 3. For example, the DRAM 6 stores an L2P table 61, a block management table 62, an active block list 63, a free block list 64, and an overflow management table 65.

The L2P table 61 is a table that manages the correspondence relationship between logical addresses and physical addresses. The physical address is an address indicating a storage position in the NAND flash memory 5. The physical address is called a physical block address (PBA), a memory block address (MBA) or the like. The L2P table 61 manages the correspondence relationship between LBAs and PBAs in units of sectors, for example.

The block management table 62 is a table that manages the physical blocks and superblocks in the SSD 3. The block management table 62 includes, for example, information on defective blocks among the physical blocks in the SSD 3, and information on physical blocks constituting each superblock. The defective block is a block where data reading/ writing cannot be correctly executed. The defective block can also be called a bad block.

In manufacturing steps of NAND chips #1 to #32, a defective block may sometimes occur in each NAND chip. The controller 4 manages defective blocks included in each NAND chip (or each plane in each NAND chip) using the block management table 62. The block management table 62 stores defective information that indicates defective blocks included in each NAND chip (or each plane).

Note that the defective blocks managed by the block management table 62 may only include defective blocks caused by the manufacturing process of the NAND chips #1 to #32, or may also include defective blocks that became defective after start of using the SSD 3. Information that indicates each defective block in the NAND chips #1 to #32 caused by the manufacturing process may be loaded from the NAND flash memory 5 to the block management table 62.

The active block list 63 is a list of superblocks that each include at least a valid data item. The valid data item is data stored at a storage position indicated by a physical address associated with a logical address. For example, data stored at a storage position indicated a PBA that the L2P table 61 refers to is a valid data item. The valid data item is data that can be targeted in a read by the host 2. The superblocks managed by the active block list 63, each of which stores at least one valid data item, are superblocks allocated as write destination blocks, or superblocks to which writing has been completed. The superblocks managed by the active block list 63 can be called, for example, active blocks.

The free block list 64 is a list of superblocks that store only invalid data items. The invalid data item is data stored at a storage position indicated by a physical address associated with no logical address. For example, data stored at a storage position indicated by a PBA that the L2P table 61 does not refer to is an invalid data item. The invalid data item is data that cannot be targeted in a read by the host 2. The superblocks managed by the free block list 64 are superblocks that are subjected to the data erase process and thereby allow data to be newly written therein. The superblocks managed by the free block list 64 are called, for example, free blocks. The free block is a superblock that can be used to allow data to be written therein again.

The overflow management table 65 is a table that manages, on a superblock-by-superblock basis, a physical address range indicating a storage area that stores overflow data. The overflow data is data items that have not been successfully written into a write destination superblock among data items belonging to an RU to which the write destination superblock is allocated. For example, when the size of the writable storage area in the write destination superblock is smaller than the aggregate size of data items belonging to the RU, data items belonging to the RU that cannot be stored in the write destination superblock can be overflow data. The overflow management table 65 manages the correspondence relationship between a superblock, and a physical address range indicating a storage area that stores data overflowing from the superblock.

Figure 2:
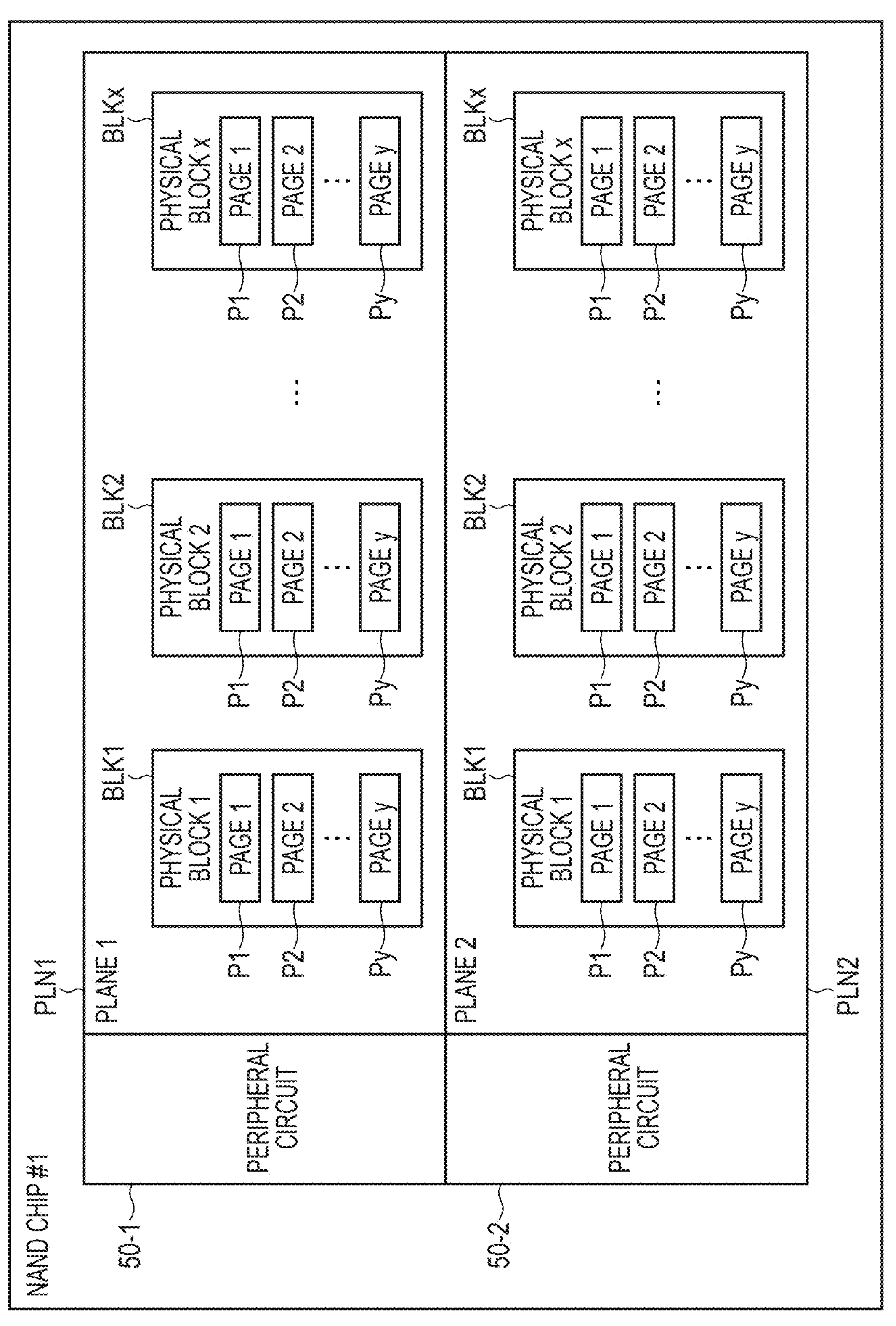
FIG. 2 shows a configuration example of a memory chip included in the memory system according to the embodiment.

Next, an internal configuration example of the NAND chip is described. FIG. 2 shows the configuration example of the NAND chip included in the SSD 3 according to the embodiment. In FIG. 2, the NAND chip #1 is described as an example. Note that, the other NAND chips #2 to #32 have a configuration similar to that of the NAND chip #1.

The NAND chip #1 includes two planes (planes PLN1 and PLN2), and two peripheral circuits (peripheral circuits 50-1 and 50-2) corresponding to the respective two planes.

The planes PLN1 and PLN2 each include a memory cell array. The memory cell arrays of the planes PLN1 and PLN2 each include physical blocks BLKI to BLKx. Each of the physical blocks is a unit of a data erase operation. Each of the physical blocks BLKI to BLKx is also called a flash block, or a memory block. The physical blocks BLKI to BLKx each include pages Pl to Py. Each of the pages PI to Py is a unit of a data write operation and a data read operation. The pages PI to Py each include, for example, a plurality of memory cells connected to the same word line.

Each of the peripheral circuits 50-1 and 50-2 is a circuit that controls the memory cell array of the corresponding plane. The peripheral circuit 50-1 corresponds to the plane PLN1. The peripheral circuit 50-2 corresponds to the plane PLN2. The peripheral circuits 50-1 and 50-2 each include, for example, a row decoder, a column decoder, a sense amplifier, and a page buffer. Upon receipt of an address and a command from the NAND I/F 46, each of the peripheral circuits 50-1 and 50-2 executes a data write operation, a data read operation, or a data erase operation, for the memory cell array of the corresponding plane.

Figure 3:
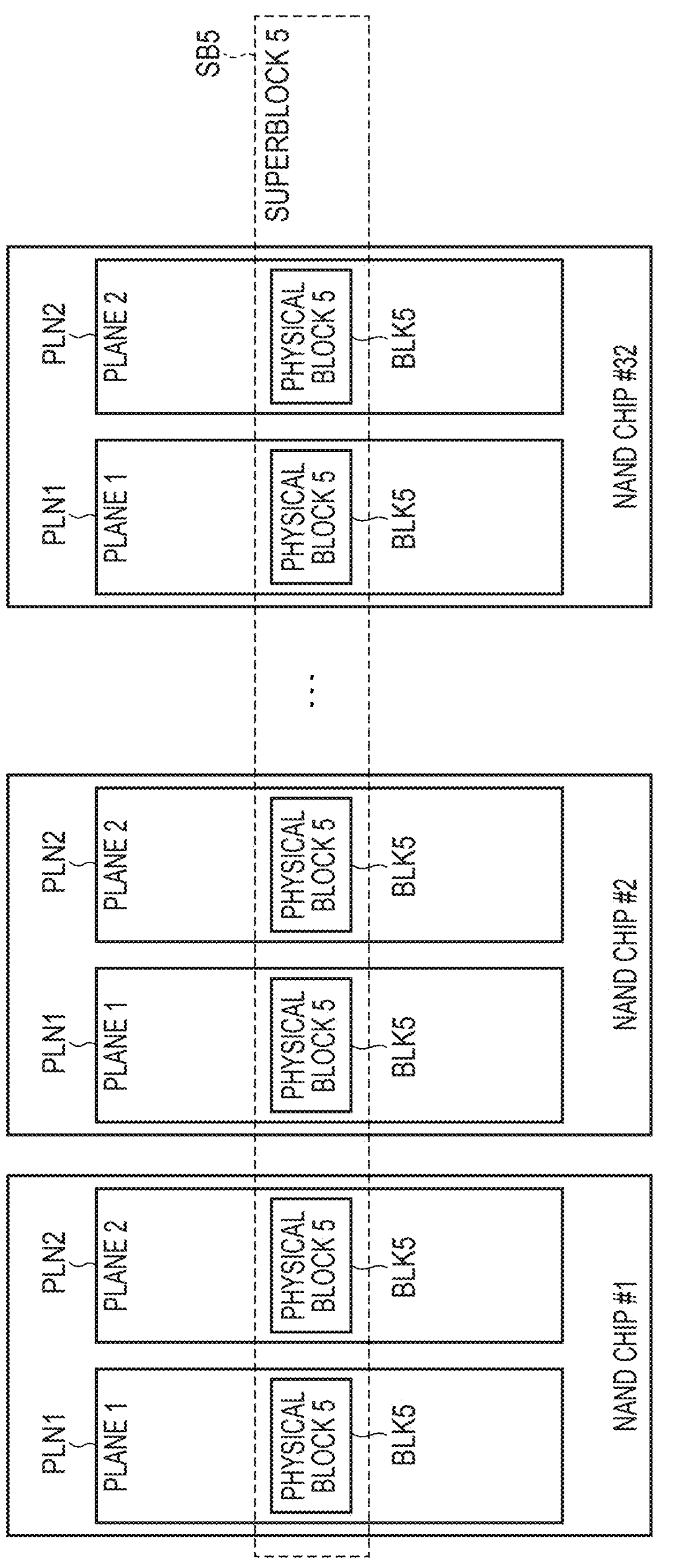
FIG. 3 shows an example of a superblock managed in the memory system according to the embodiment.

Next, the superblock is described. FIG. 3 is a block diagram showing a configuration example of a superblock in the SSD 3 according to the embodiment. The SSD 3 configures the superblock as an aggregation of physical blocks. The aggregation of the physical blocks constituting the superblock is, for example, an aggregation of physical blocks selected one by one from planes that can operate in parallel. The superblock is also called a logical block or a block group. Here, a case where the number of channels is eight, the number of banks is four, and the number of planes is two, is described.

One superblock includes in total 64 physical blocks selected one by one from the 2 planes of the 32 NAND chips corresponding to the configuration of 8 channels×4 banks. Note that in a case where the NAND chips #1 to #32 each have a configuration including only one plane, one superblock includes 32 physical blocks selected one by one from the NAND chips #1 to #32.

FIG. 3 shows, as an example, one superblock SB5 that includes 64 physical blocks. Here, the superblock SB5 includes physical blocks BLK5 of the planes PLN1 and PLN2 of the NAND chips #1 to #32.

The controller 4 can execute the data erase process in units of superblocks. It is hereinafter assumed that, in the SSD 3, the data erase process is executed in units of superblocks. That is, when the entire data in the superblock SB5 is invalid data items, the controller 4 executes the data crase process for the superblock SB5. In the data erase process for the superblock SB5, the data erase process is executed for each physical block 5 included in the superblock SB5.

The controller 4 can execute the data write operation in parallel for the physical blocks 5 that constitute the superblock SB5. In the data write operation, the controller 4 writes data into a superpage that is an aggregation of the pages selected one by one from the physical blocks 5. In this case, the controller 4 may write a parity used for error correction in data reading, into at least one page among the pages that constitute the superpage. The superpage is also called a logical page.

Figure 4:
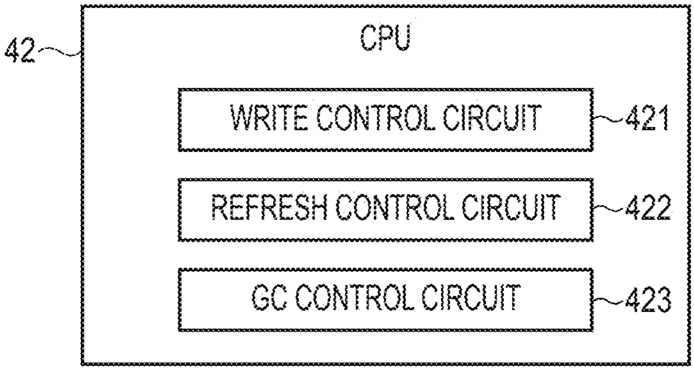
FIG. 4 shows a functional configuration example of a CPU included in the memory system according to the embodiment.

Next, a functional configuration example of the CPU 42 is described. FIG. 4 shows the functional configuration example of the CPU 42 included in the SSD 3 according to the embodiment.

The CPU 42 executes firmware, thereby functioning as a write control circuit 421, a refresh control circuit 422, and a garbage collection (GC) control circuit 423. Note that part, some, or all of these functions may be executed by a dedicated hardware in the controller 4.

The write control circuit 421 controls a data write process to the NAND flash memory 5. Upon receipt of a write command from the host 2, the write control circuit 421 executes a data write process.

When the received write command includes no RUH, the write control circuit 421 executes a normal data write process. That is, when the write command received from the host 2 designates no write destination reclaim unit (RU), the write control circuit 421 executes the normal write process. The write control circuit 421 obtains from the host 2, data associated with the received write command, and writes the data into the NAND flash memory 5. The write control circuit 421 updates the L2P table 61 so as to associate the LBA designated by the write command with the physical address indicating the storage position in the NAND flash memory 5 where the data is written. The write control circuit 421 then transmits to the host 2, a completion response corresponding to the processed write command.

On the other hand, when the write command includes an RUH, the write control circuit 421 executes a data write process conforming to the Flexible Data Placement (FDP). That is, when the write command received from the host 2 designates a write destination reclaim unit (RU), the write control circuit 421 executes a data write process conforming to the FDP. In this case, the write control circuit 421 identifies a write destination superblock, based on the RUH designated by the write command. The write control circuit 421 obtains from the host 2, data associated with the received write command, and writes the data into the identified superblock in the NAND flash memory 5. The write control circuit 421 updates the L2P table 61 so as to associate the LBA designated by the write command with the physical address indicating the storage position in the NAND flash memory 5 where the data is written. The write control circuit 421 then transmits to the host 2, a completion response corresponding to the processed write command.

The refresh control circuit 422 is a circuit that controls a refresh process in the SSD 3. The refresh process is a process of executing data reading and data writing for data of which the time period after being written into the NAND flash memory 5 exceeds a predetermined time period. In this case, the refresh control circuit 422 may execute an error correction process for the read data. When data stored in a certain superblock is determined as target data of the refresh process, the refresh control circuit 422 reads the data from the superblock, and writes the read data into another superblock (or the same superblock). The refresh control circuit 422 then updates the L2P table 61 so as to associate the LBA corresponding to the data moved by the refresh process, with the physical address indicating the storage position of the superblock where the data is newly written.

The GC control circuit 423 is a circuit that controls a garbage collection (GC) process in the SSD 3. The GC process is a process of reducing the number of superblocks where valid data items and invalid data items are present in a mixed manner, and increasing the number of free blocks, in the SSD 3. For example, when the number of free blocks falls below a threshold, the GC control circuit 423 executes the GC process. In the GC process, the GC control circuit 423 selects an original superblock that is the source of the garbage collection (GC). For example, the GC control circuit 423 prioritizes a superblock having a low valid data ratio among active blocks in the SSD 3, and selects the superblock as the GC source superblock. The GC control circuit 423 then selects a garbage collection (GC) destination superblock where the valid data item stored in the GC source superblock is to be written. For example, the GC control circuit 423 selects, as the GC destination superblock, a free block managed by the free block list 64. Alternatively, the GC control circuit 423 can select, as the GC destination superblock, a write destination superblock of the normal data write process (i.e., a write process corresponding to a write command including no RUH).

Next, a specific example of the data write process conforming to the FDP is described. FIG. 5 illustrates data writing conforming to the FDP executed in the information processing system 1 that includes the SSD 3 according to the embodiment.

Before description of the data write process conforming to the FDP, a data write process in a case where the host or SSD does not support the FDP is described. In this case, the host issues a write command that designates no RUH. Hereinafter, the write command that designates no RUH is called a normal write command. In this case, the host issues the normal write command, based on each of applications operating in parallel in the host. The host issues the normal write command to the SSD irrespective of the application among the applications which causes the write command to be issued.

The SSD having received the normal write command writes data associated with the received write command, into a write destination superblock for the normal data write process.

Accordingly, in the case where the host or the SSD does not support the FDP, data items based on two or more applications may be present in the write destination superblock in a mixed manner. When a data item pertaining to a certain application is no longer necessary in a superblock where data items have been written according to such a writing scheme, the host transmits, to the SSD, a trim command that designates the data item pertaining to the certain application. The SSD having received the trim command causes the data item pertaining to the application in the SSD to be an invalid data item. Thus, valid data items and invalid data items may be stored in one superblock.

The description returns to FIG. 5. In FIG. 5, a case where the host 2 and the SSD 3 supports the FDP is assumed.

It is further assumed that the host 2 executes four applications (applications 1 to 4) in parallel. The host 2 allocates one RUH to each application, for example. RUH1 is allocated to the application 1. RUH2 is allocated to the application 2. RUH3 is allocated to the application 3. RUH4 is allocated to the application 4.

When data writing conforming to the FDP is executed, the host 2 issues a write command that includes information designating an RUH corresponding to each application. Specifically, in data writing based on the application 1, the host 2 issues a write command that designates RUH1. In data writing based on the application 2, the host 2 issues a write command that designates RUH2. In data writing based on the application 3, the host 2 issues a write command that designates RUH3. In data writing based on the application 4, the host 2 issues a write command that designates RUH4.

It is herein assumed that the SSD 3 includes one endurance group, and one reclaim group.

The endurance group is a storage area included in one domain. The endurance group includes one or more reclaim groups.

The reclaim group is an aggregation that includes one or more Reclaim Units (RU).

In a case where the SSD 3 includes one endurance group and one reclaim group, designation of one RUH determines one write destination RU. That is, the SSD 3 supports writable RUs equal to the number of RUHs. In a case where there are two or more endurance groups, one endurance group is designated by a namespace identifier (ID). In a case where there are two or more reclaim groups, one reclaim group in the endurance group is designated by a reclaim group identifier (ID). Accordingly, using the RUH, one RU in the reclaim group can be designated.

The SSD 3 allocates a write destination superblock (SB) to each RUH. One write destination SB corresponds to one write destination RU. That is, the SSD 3 allocates one superblock to one RU. For example, data associated with the write command designating RUH1 is stored in a write destination SB allocated to RUH1. Data associated with the write command designating RUH2 is stored in a write destination SB allocated to RUH2. Data associated with the write command designating RUH3 is stored in a write destination SB allocated to RUH3. Data associated with the write command designating RUH4 is stored in a write destination SB allocated to RUH4.

If the available storage area in a write destination SB runs out, and new data can no longer be written therein, the controller 4 cancels the allocation of the superblock as the write destination SB. The controller 4 then selects any superblock from the free block list 64. The controller 4 executes the data crase process for the selected superblock, and allocates the superblock as a new write destination SB.

When one superblock is allocated to one RU, and the superblock includes no defective block, the available storage area of the superblock matches the available storage area of the RU. That is, when the available storage area of the superblock runs out, the available storage area of the RU also runs out. Thus, a superblock newly allocated as a write destination SB is associated with a new write destination RU.

As described above, the controller 4 determines a write destination SB associated with a write command, based on the RUH included in the received write command. That is, data items associated with write commands designating different RUHs are written respectively into different write destination SBs. Accordingly, the host 2 can prevent data items pertaining to different applications from being stored in one superblock. Here, the case where different RUHs are allocated to the respective applications is described. Alternatively, in a case where a plurality of users use the host 2 or the SSD 3, different RUHs may be allocated to the respective users. In a case where a plurality of hosts 2 use the SSD 3, different RUHs may be allocated to the respective hosts 2. In each of the cases, the host 2 and the SSD 3 can prevent different types of data items from being stored in one superblock, using the multiple RUHs.

In this case, when a data item pertaining to a certain application is no longer necessary, the host 2 transmits, to the SSD 3, a trim command that designates the data item pertaining to the certain application. For example, the host 2 transmits, to the SSD 3, the trim command for invalidating the data item with a certain RU corresponding to the certain application. The SSD 3 having received the trim command causes the data item belonging to the RU designated by the trim command to be an invalid data item. Accordingly, the superblock allocated to the RU that is no longer necessary becomes a free block that stores only invalid data items without the GC process. Thus, a write amplification factor (WAF) in the SSD 3 is improved. The WAF is a ratio of data items written in the NAND flash memory 5 based on a write command received from the host 2 to the aggregate size of the data items written in the NAND flash memory 5.

Figure 6:
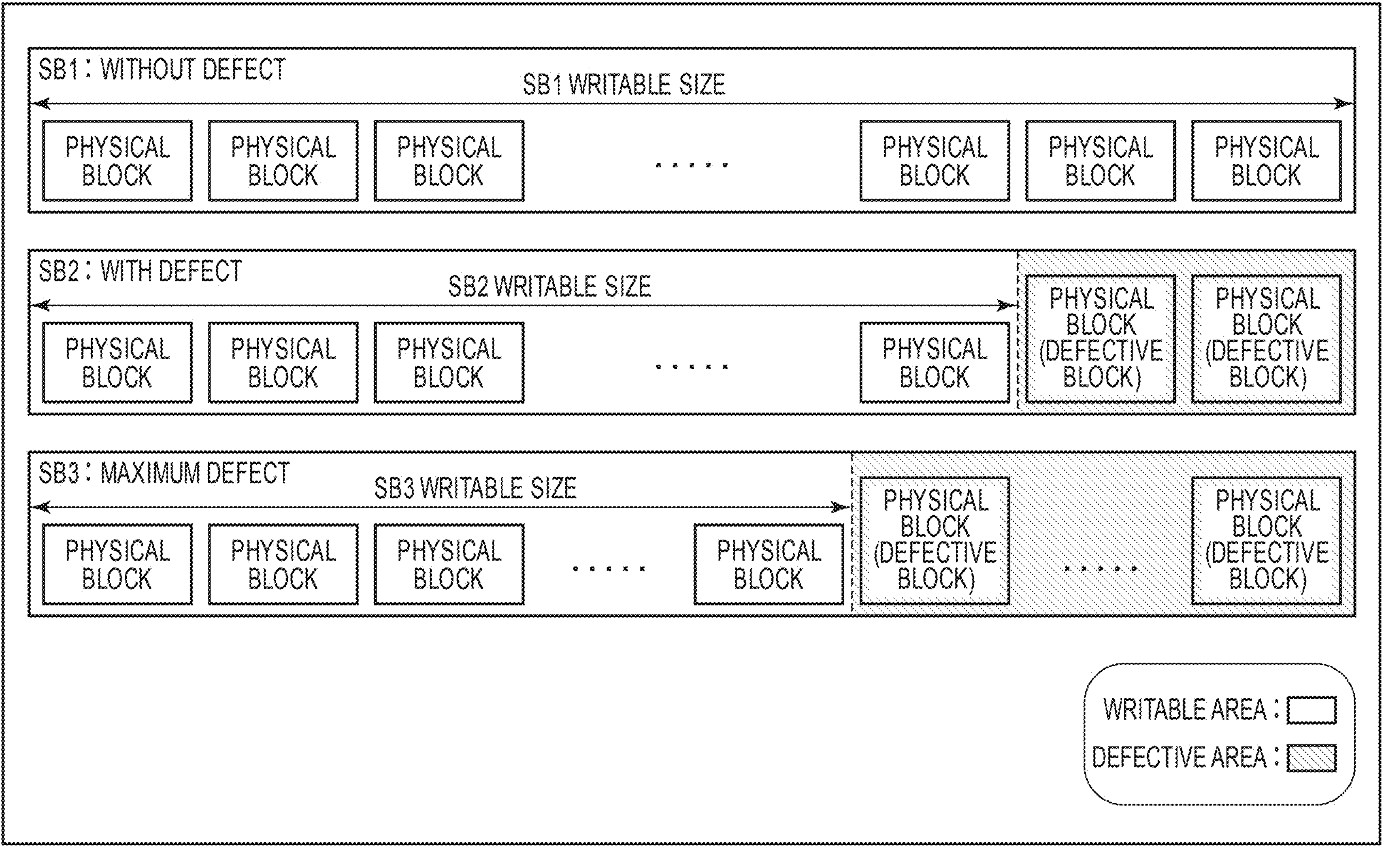
FIG. 6 shows an example of writable sizes of superblocks managed in the memory system according to the embodiment.

Next, the writable sizes of superblocks are described. FIG. 6 shows an example of the writable sizes of superblocks managed in the SSD 3 according to the embodiment.

By referring to FIG. 5, the case where the superblock includes no defective block has been described. However, each of the superblocks in the SSD 3 may include defective blocks. No data can be written in storage areas corresponding to the defective blocks in the physical blocks constituting a superblock. Hereinafter, storage areas corresponding to defective blocks are called defective areas. On the other hand, storage areas where data can be written are called writable areas.

By referring to superblocks SB1, SB2, and SB3 as shown in FIG. 6, the writable sizes of three types of superblocks are described.

The superblock SB1 in FIG. 6 is a superblock that includes no defective block. In other words, the superblock SB1 is a superblock that includes no defective area. All the physical blocks in the superblock SB1 are normal physical blocks, and constitute a writable area. The numbers of physical blocks respectively constituting the superblocks in the SSD 3 are the same. Accordingly, the writable size of the superblock SB1 including no defective area is the maximum writable size of a superblock. The maximum writable size of a superblock is, for example, a total of the sizes of the physical blocks operable in parallel in one superblock, and, in the example described by referring to FIG. 3, a total of the sizes of the 64 physical blocks.

The superblock SB2 in FIG. 6 is a superblock that includes two defective blocks. That is, the superblock SB2 is a superblock that includes a defective area. Part of the storage area of the superblock SB2 that corresponds to two defective blocks is the defective area. The other part of the storage area is a writable area. The writable size of the superblock SB2 is a size obtained by subtracting the size of the defective area corresponding to the two defective blocks from the maximum writable size of a superblock with no defects.

The superblock SB3 in FIG. 6 is a superblock that includes the maximum allowable number of defective blocks in the SSD 3. That is, the superblock SB3 is a superblock that includes the maximum defective area. The size of the defective area of the superblock SB3 is the maximum among the sizes of the defective areas in the superblocks in the SSD 3. In other words, the superblock SB3 has the minimum writable size among the superblocks in the SSD 3.

As described above, each of the superblocks in the SSD 3 can have a different writable size ranging from the maximum writable size in the case with no defective area to the minimum writable size in the case with the maximum defective area.

On the other hand, in data management conforming to the FDP, the host 2 and the SSD 3 determine a fixed size (RU size) for the RUs. The same RU size is set for the multiple RUs managed between the host 2 and the SSD 3. In a case of assuming that one RU is associated with one superblock in the SSD 3, it is required to associate the fixed RU size with each of the superblocks having writable sizes ranging from the maximum writable size to the minimum writable size as described above.

Before the correspondence relationship between the writable size of the superblock and the RU size in the embodiment is described, the correspondence relationships in two comparative examples are described.

First, by referring to FIG. 7, a first comparative example is described. FIG. 7 illustrates the relationship between a superblock and a RU size managed in a memory system according to the first comparative example.

In the first comparative example, the host and the SSD use the maximum writable size of a superblock as the RU size. The maximum writable size is the writable size of a superblock with no defective area.

The memory system according to the first comparative example uses only superblocks with no defective area, for data writing based on write commands conforming to the FDP (FDP host writing). That is, only the superblocks with no defective area are used as write destination superblocks corresponding to RUHs.

In FIG. 7, the superblocks SB1, SB2, SB3 and the like are superblocks including no defective area, and can be used as write destination superblocks for FDP host writing. An RU is allocated to each superblock allocated as the write destination superblock.

On the other hand, superblocks having defective areas are not used as write destination superblocks for FDP host writing. In FIG. 7, the superblocks SB4 and SB5 are superblocks that have defective areas. Since these superblocks each have a writable size smaller than the RU size, they are not used for FDP host writing.

In the first comparative example, the superblocks having defective areas (superblocks SB4 and SB5 in FIG. 7) are not used for FDP host writing. Accordingly, resources, such as physical blocks usable for data writing in the SSD, are wasted. The number of free blocks tends to fall below a threshold accordingly. As a result, the frequency of executing the garbage collection process increases. This also affects degradation of the performance of the SSD.

Next, by referring to FIG. 8, a second comparative example is described. FIG. 8 illustrates the relationship between a superblock and a RU size managed in a memory system according to the second comparative example.

In the second comparative example, the minimum writable size of a superblock is used as the RU size. The minimum writable size is the writable size of a superblock having the maximum defective area.

The memory system according to the second comparative example can use any superblock for FDP host writing. That is, the SSD in the second comparative example may allocate any superblock having the maximum defective area as a write destination superblock corresponding to a RUH. The SSD can allocate any superblock, including a superblock with no defective area, as a write destination superblock corresponding to a RUH.

Note that the host only writes data having the RU size determined for a write destination RU. Accordingly, no data is written into part of the storage area of a write destination superblock having a larger writable size than the minimum writable size.

In FIG. 8, any of superblocks, including superblocks SB1, SB2, SB3 and the like each of which includes no defective area, and superblocks SB4, SB5 and the like each of which includes defective areas, can be used as a write destination superblock of FDP host writing. An RU is allocated to each superblock allocated as the write destination superblock.

Here, the RU size is the minimum writable size. Accordingly, data as large as the minimum writable size is written into a superblock allocated as the write destination superblock for FDP host writing. No data is written into part of the storage area of each superblock that exceeds the minimum writable size. Specifically, in each superblock including no defective area, no data is written in the storage area having the size of the maximum defective area even though data can be written therein. In each superblock including a defective area smaller than the maximum defective area, no data is written in the storage area having the size corresponding to the difference between the maximum defective area and the actual defective area even though data can be written therein.

These storage areas where no data is written are not used even though data can be written therein. Accordingly, these areas are wasted resources in the SSD. Similar to the first comparative example, this also affects degradation of the performance of the SSD.

As described above, in each of the first comparative example and the second comparative example, part of the writable storage area is not used for FDP host writing. That is, resources of the SSD are wasted.

In contrast, the SSD 3 according to the embodiment determines the maximum writable size as the RU size, uses any superblock for FDP host writing, and writes overflow data into an overflow superblock. Accordingly, in the embodiment, the resources of the SSD 3 are not wasted.

By referring to FIG. 9, the RU size in the SSD 3 according to the embodiment is described. FIG. 9 shows a write destination superblock in the SSD 3 according to the embodiment.

According to the SSD 3 and the host 2 in the embodiment, similar to the first comparative example, the RU size is set to the maximum size among the writable data sizes of the superblocks in the SSD 3. According to the SSD 3 in the embodiment, similar to the second comparative example, any superblock can be allocated as a write destination superblock (SB) for FDP host writing.

When a write destination SB includes no defective area, the controller 4 can write, into the write destination SB, data having the RU size as large as the maximum writable size. Accordingly, the controller 4 can fully utilize the writable storage area in the write destination SB.

In other words, the controller 4 allocates one superblock to each RU. The controller 4 allocates a superblock of any type as a write destination SB for FDP host writing. Accordingly, not only a superblock including no defective area but also any of superblocks including defective areas can be allocated as a write destination SB. Note that the controller 4 may prioritize the superblocks including no defective area, and allocate any of them as a write destination SB for FDP host writing.

The controller 4 prepares not only a write destination SB for FDP host writing but also an overflow superblock (SB). The controller 4 allocates a superblock of any type as the overflow SB. The overflow SB is a superblock where the remaining data is written in FDP host writing, which corresponds to the remaining parts of data having the RU size and has not been written into the write destination SB.

The controller 4 may write, into the overflow SB, data associated with a normal write command (NonFDP Write) which does not designate a RUH. Alternatively, the controller 4 may separately prepare a write destination SB where data associated with the normal write command is written. In this case, the controller 4 writes data associated with the normal write command, into this write destination SB.

In FIG. 9, the superblock SB1 is allocated as a write destination SB corresponding to RUH1. The superblock SB2 is allocated as a write destination SB corresponding to RUH2. In FIG. 9, the superblocks SB1 and SB2 are superblocks that have defective areas. The superblock SB3 is allocated as the overflow SB. The superblock SB3 is a superblock that includes no defective area.

The remaining data not written into the superblocks SB1 and SB2 is written into the superblock SB3, which is the overflow SB. Overflow data in FDP host writing is data not written to the write destination SB because the write destination SB includes a defective area. The controller 4 stores, in the overflow management table 65, the correspondence relationship between the physical address range indicating the storage area where the overflow data is written in the overflow superblock SB3, and the original write destination superblock. For example, when the overflow data from the superblock SB1 is written into the superblock SB3, the controller 4 associates information indicating the superblock SB1 with the physical address range indicating the storage area where the overflow data is written, and stores them in the overflow management table 65. The information indicating the superblock is, for example, a superblock identifier (SBID).

Here, procedures of an initialization process between the host 2 and the SSD 3 are described. Hereinafter, a process for managing the RU size executed in a case where both the host 2 and the SSD 3 support the Flexible Data Placement (FDP) is described.

FIG. 10 is a sequence diagram illustrating RU size management in the memory system according to the embodiment.

Step 1: The SSD 3 provides the RU size for the host 2. Here, the RU size is the maximum writable size of a superblock. The SSD 3 provides the RU size for the host 2, based on a command for requesting the RU size received from the host 2. The host 2 manages data belonging to a RU, based on the provided RU size.

Step 2-1: As for FDP host writing, the host 2 classifies data items with respect to each RUH, and separately manages the data items. For example, the host 2 issues one or more write commands when the size of data pertaining to a certain RUH reaches the RU size. The one or more write commands may be a plurality of write commands that each request to write partial data in the data having the RU size. Alternatively, the one or more write commands may be one write command that requests to write data having the RU size. The host 2 may issue a write command for writing partial data in the data having the RU size before the data having the RU size is prepared in the memory 22 of the host 2. When the write command for writing partial data in the data having the RU size is issued, the host 2 calculates the remaining size of the write destination RU, based on the RU size provided in Step 1.

Step 2-2: Alternatively, the host 2 transmits, to the SSD 3, a command for requesting the remaining size of the write destination RU. In response to this command, the SSD 3 notifies the host 2 of, for example, Reclaim Unit Available Media Writes (RUAMW) conforming to the NVMe standard. The controller 4 having received the command from the host 2 notifies the host 2 of the size (RUAMW) of the remaining available storage area of the RU designated by the command. The controller 4 calculates, for example, the remaining available storage area of the RU by subtracting, from the RU size, the size of data written in the write destination superblock allocated to the designated RU, and the aggregate size of data items belonging to the designated RU in data written in the overflow superblock.

Figure 11:
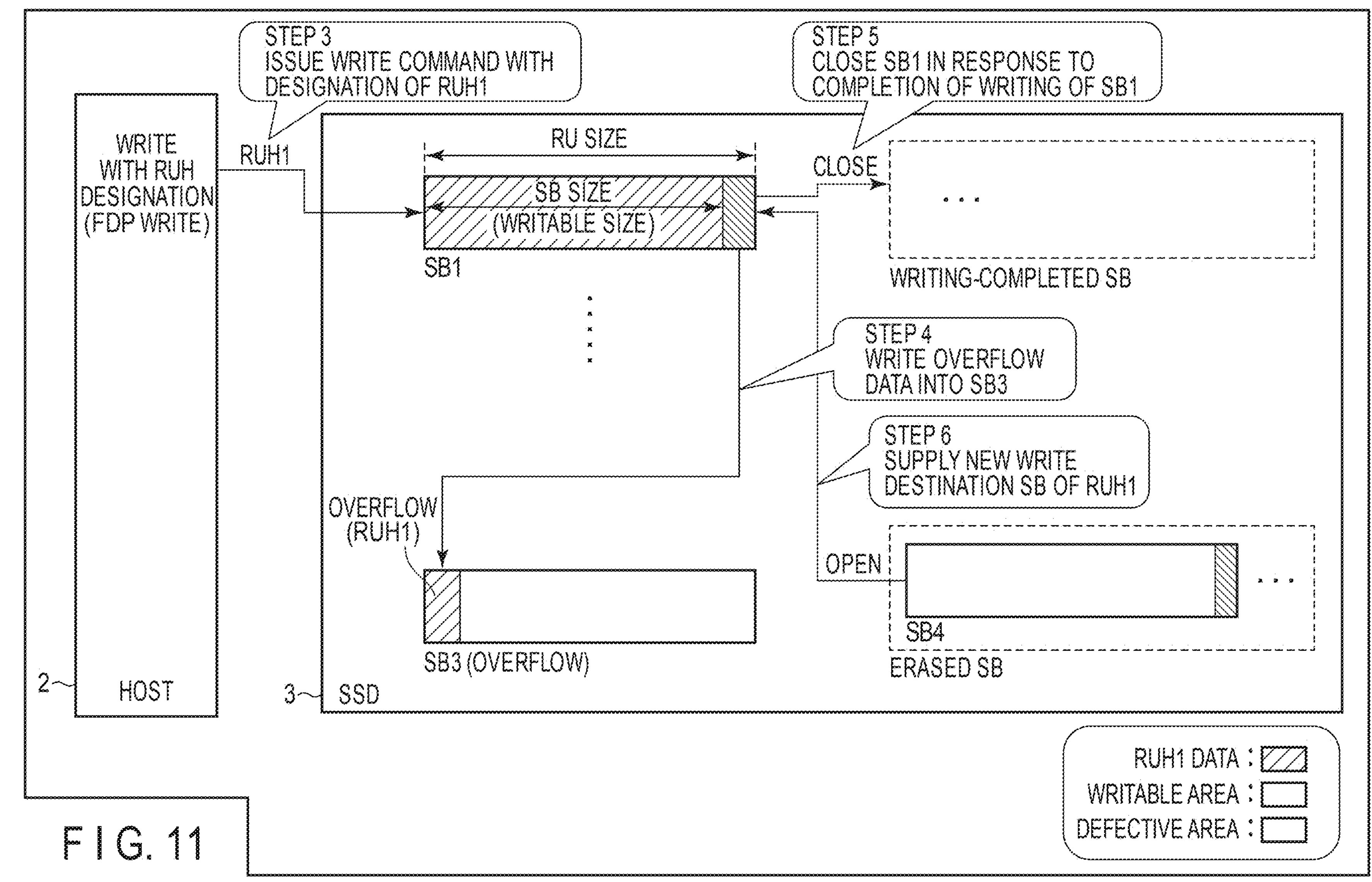
FIG. 11 is a first diagram illustrating a write process in the memory system according to the embodiment.

Next, a write process is described. FIG. 11 is a first diagram illustrating the write process in the SSD 3 according to the embodiment. First, data writing based on a write command that designates RUH1 is described.

Step 3: In response to the fact that the size of data pertaining to RUH1 reaches the RU size, the host 2 issues a write command designating RUH1 to the SSD 3. The controller 4 of the SSD 3 writes the writable size of data in the data associated with the received write command, into the write destination superblock SB1 allocated to RUH1. Data in the data associated with the received write command that cannot be written in the superblock SB1 because of the defective area becomes overflow data.

Step 4: The controller 4 writes, into the overflow superblock SB3, the overflow data in the data associated with the received write command. In this case, the controller 4 stores, in the overflow management table 65, the correspondence relationship between the information indicating the superblock SB1 and the physical address range indicating the storage area where the overflow data is written.

Step 5: In response to completion of the data writing into the superblock SB1, i.e., in response to the fact that the superblock SB1 runs out of the available writable storage area, the controller 4 closes the superblock SB1. The controller 4 then cancels the allocation of the superblock SB1 as the write destination superblock.

Step 6: The controller 4 selects the superblock SB4 from the free block list 64. The controller 4 executes a data erase process for the selected superblock SB4. The controller 4 then allocates the selected superblock SB4 as a new write destination superblock.

Figure 12:
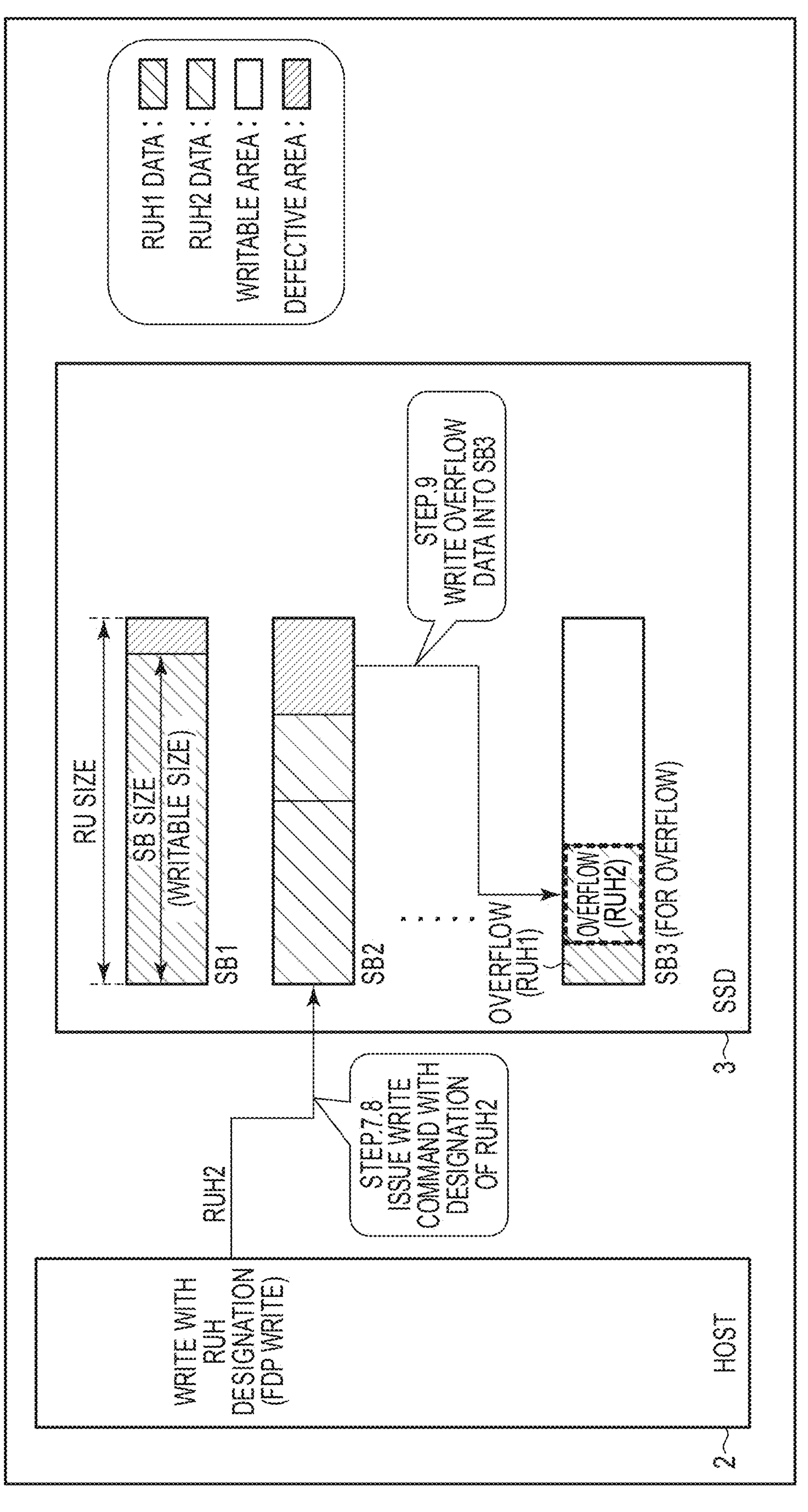
FIG. 12 is a second diagram illustrating a write process in the memory system according to the embodiment.

Next, data writing based on a write command that designates RUH2 is described. FIG. 12 is a second diagram illustrating the write process in the SSD 3 according to the embodiment.

Step 7: The host 2 issues, to the SSD 3, a write command for writing data pertaining to RUH2. It is herein assumed that a write command associated with data having a data size less than the RU size is issued. The controller 4 of the SSD 3 writes the data associated with the received write command, in the write destination superblock SB2 allocated to RUH2.

Step 8: The host 2 issues, to the SSD 3, another write command for writing data pertaining to RUH2. It is herein assumed that the total size of data items respectively associated with the two write commands issued in Steps 7 and 8 equals the RU size. The controller 4 of the SSD 3 writes the data associated with the received write command, into the write destination superblock SB2 allocated to RUH2.

Step 9: The controller 4 writes overflow data due to the defective area in the superblock SB2, into the overflow superblock SB3. In this case, the controller 4 stores, in the overflow management table 65, the correspondence relationship between the information indicating the superblock SB2 and the physical address range indicating the storage area where the overflow data is written.

As described above, in the SSD 3 according to the embodiment, the controller 4 sets the RU size to the maximum writable size of a superblock. Irrespective of whether any defective area is included or not, the controller 4 uses any superblock as the write destination superblock in FDP host writing. The controller 4 writes, into the overflow superblock, the remaining data having not been written into the write destination superblock. Accordingly, in the SSD 3 according to the embodiment, the resources of the SSD 3 can be used for FDP host writing without any waste.

Next, the details of the refresh process are described.

Figure 13:
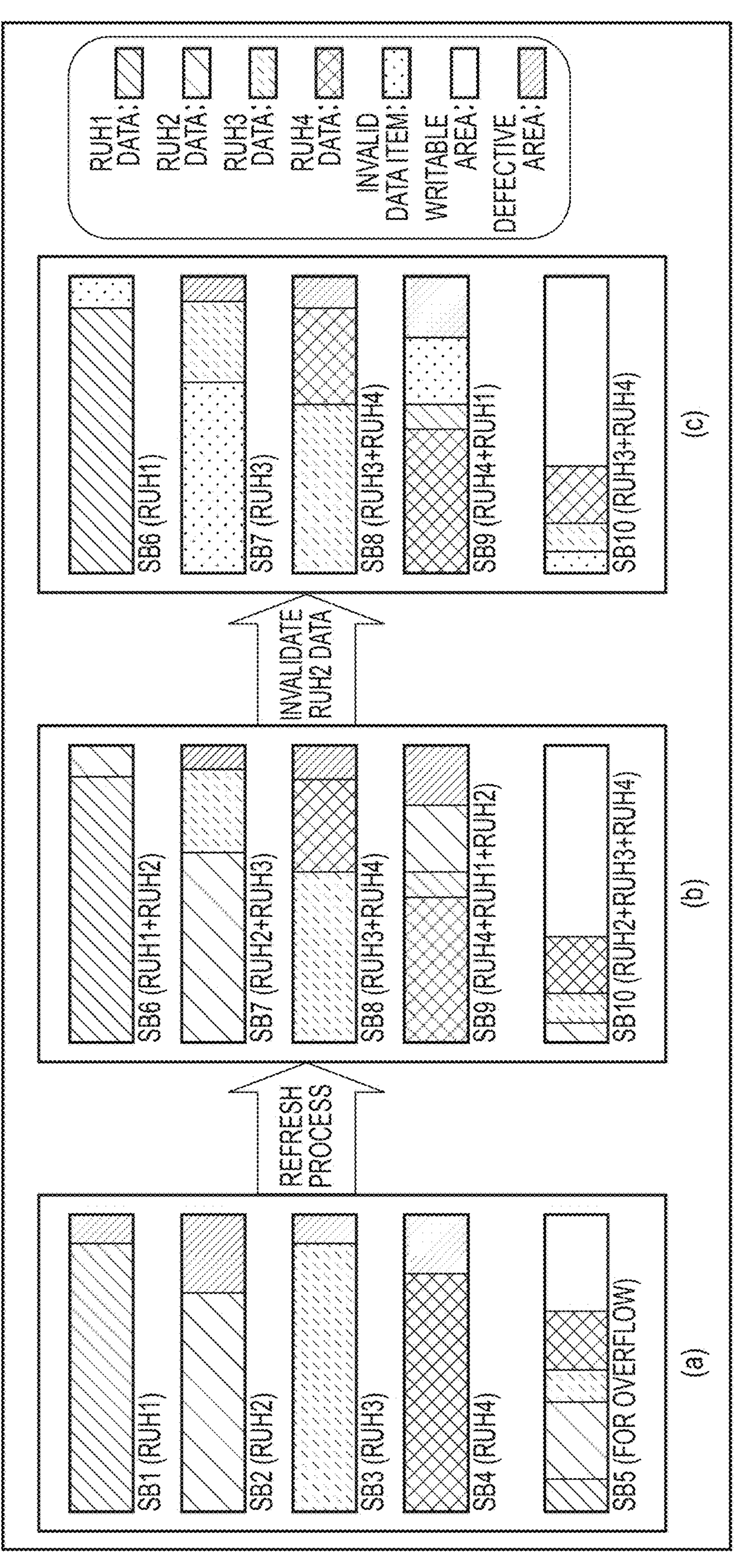
FIG. 13 shows an example of a refresh process executed in a memory system according to a third comparative example.

First, referring to FIG. 13, a refresh process according to a third comparative example is described. FIG. 13 shows an example of the refresh process executed in the memory system according to the third comparative example.

Part (a) of FIG. 13 shows a state before execution of the refresh process. In this state, a superblock SB1 stores only RUH1 data. A superblock SB2 stores only RUH2 data. A superblock SB3 stores only RUH3 data. A superblock SB4 stores only RUH4 data. A superblock SB5 that is an overflow superblock stores RUH1 data, RUH2 data, RUH3 data, and RUH4 data.

Here, the refresh process in the third comparative example is executed. It is herein assumed that the superblocks SB1, SB2, SB3, SB4, and SB5 are selected as refresh target superblocks. In the refresh process, the controller writes data items stored in the refresh target superblocks, into transfer destination superblocks. Here, superblocks SB6, SB7, SB8, SB9, and SB10 are the transfer destination superblocks.

In part (b) of FIG. 13, the data items stored in the refresh target superblocks SB1, SB2, SB3, SB4, and SB5 are transferred to the superblocks SB6, SB7, SB8, SB9, and SB10, which are the transfer destination superblocks.

Specifically, the controller writes, into the superblock SB6, the RUH1 data stored in the superblock SB1. The controller then writes part of the RUH2 data stored in the superblock SB2, into the remaining storage area of the superblock SB6. Thus, such RUH1 data and RUH2 data are stored in the superblock SB6. Such presence of data items in a mixed manner is caused because a defective area is included in the refresh target superblock SB1 but no defective area is included in the transfer destination superblock SB6.

The controller writes the remaining RUH2 data stored in the superblock SB2 into the transfer destination superblock SB7. The controller then writes part of the RUH3 data stored in the superblock SB3, into the remaining storage area of the superblock SB7. Thus, such RUH2 data and RUH3 data are stored in the superblock SB7. Such presence of data items in a mixed manner is caused because the part of the RUH2 data is transferred from the superblock SB2 to the superblock SB6, and the size of the defective area of the superblock SB7 is smaller than the defective area of the superblock SB2.

The controller writes the remaining RUH3 data stored in the superblock SB3 into the transfer destination superblock SB8. The controller then writes part of the RUH4 data stored in the superblock SB4, into the remaining storage area of the superblock SB8. Thus, such RUH3 data and RUH4 data are stored in the superblock SB8. Such presence of data items in a mixed manner is caused because the part of the RUH3 data stored in the superblock SB3 is transferred to the superblock SB7.

The controller writes the remaining RUH4 data stored in the superblock SB4 into the transfer destination superblock SB9. The controller then writes the RUH1 data and part of the RUH2 data stored in the superblock SB5, into the remaining storage area of the superblock SB9. Thus, such RUH4 data, RUH1 data, and RUH2 data are stored in the superblock SB9. Such presence of data items in a mixed manner is caused because the part of the RUH4 data stored in the superblock SB4 is transferred to the superblock SB8, and the data stored in the overflow superblock SB5 is transferred to the superblock SB9.

The controller writes the remaining RUH2 data, the RUH3 data, and the RUH4 data that are stored in the superblock SB5, into the transfer destination superblock SB10. Thus, such RUH2 data, RUH3 data, and RUH4 data are stored in the superblock SB10.

Subsequently, a case where the RUH2 data is invalidated is assumed. For example, the host transmits a trim command designating the RUH2 data to the memory system, thereby invalidating the RUH2 data.

Part (c) of FIG. 13 shows a state where the RUH2 data is invalidated. By invalidating the RUH2 data, the superblock SB10 that stores the RUH2 data in part (b) of FIG. 13 becomes a superblock that stores the invalid data item in part (c) of FIG. 13.

Specifically, the superblocks SB6, SB7, SB9, and SB10 are superblocks that store invalid data items. Each superblock still stores other valid data items. Accordingly, even if the RUH2 data is invalidated, these superblocks do not become reusable blocks (free blocks).

Next, the refresh process executed in the SSD 3 according to the embodiment is described. In the SSD 3 according to the embodiment, the refresh process may be executed also using information stored in the overflow management table 65.

FIG. 14 shows an example of the refresh process executed in the SSD 3 according to the embodiment.

Part (a) of FIG. 14 shows a state before execution of the refresh process. In this state, a superblock SB1 stores only RUH1 data. A superblock SB2 stores only RUH2 data. A superblock SB3 stores only RUH3 data. A superblock SB4 stores only RUH4 data. A superblock SB5, which is an overflow superblock, stores RUH1 data, RUH2 data, RUH3 data, and RUH4 data.

The overflow management table 65 stores information pertaining to overflow data stored in the overflow superblock SB5. Specifically, data that overflowed from the superblock SB1 is stored in a storage area indicated by a physical address range from n to m. Data that overflowed from the superblock SB2 is stored in a storage area indicated by a physical address range from m to o. Data that overflowed from the superblock SB3 is stored in a storage area indicated by a physical address range from o to p. Data that overflowed from the superblock SB4 is stored in a storage area indicated by a physical address range from p to q. Since the superblock SB5 is an overflow superblock information pertaining to overflow data corresponding to the superblock SB5 is not stored in the overflow management table 65.

Here, the refresh process according to the embodiment is executed. It is herein assumed that the superblocks SB1, SB2, SB3, SB4, and SB5 are selected as refresh target superblocks.

As shown in part (b) of FIG. 14, the controller 4 refers to the overflow management table 65, and transfers data items from the refresh target superblocks SB1, SB2, SB3, SB4, and SB5 to transfer destination superblocks SB6, SB7, SB8, and SB9. In the refresh process, the controller 4 allocates a superblock SB10 as a new overflow superblock.

The controller 4 writes, into the superblock SB6, the RUH1 data stored in the superblock SB1. The controller 4 then writes the RUH1 data stored in the superblock SB5, into the remaining storage area of the superblock SB6. That is, the RUH1 data stored in the superblock SB1, and the RUH1 data stored in the overflow superblock SB5 are transferred to the superblock SB6. Thus, the superblock SB6 becomes a superblock that stores only the RUH1 data.

The controller 4 writes the RUH2 data stored in the superblock SB2, into the superblock SB7. The controller then writes part of the RUH2 data stored in the superblock SB5, into the remaining storage area of the superblock SB7. That is, the RUH2 data stored in the superblock SB2, and the part of the RUH2 data stored in the overflow superblock SB5 are transferred to the superblock SB7. Thus, the superblock SB7 becomes a superblock that stores only the RUH2 data. Since the transfer destination superblock SB7 includes a defective area, the remaining RUH2 data stored in the superblock SB5 is regarded as overflow data. The controller 4 writes the overflow data into the new overflow superblock SB10. The controller 4 then stores, into the overflow management table 65, the correspondence relationship between the information indicating the superblock SB7 and a physical address range from r to s indicating the storage area where the overflow data is written.

The controller 4 writes, into the superblock SB8, the RUH3 data stored in the superblock SB3. The controller 4 then writes part of the RUH3 data stored in the superblock SB5, into the remaining storage area of the superblock SB8. That is, the RUH3 data stored in the superblock SB3, and the part of the RUH3 data stored in the overflow superblock SB5 are transferred to the superblock SB8. Thus, the superblock SB8 becomes a superblock that stores only the RUH3 data. Since the transfer destination superblock SB8 includes a defective area, the remaining RUH3 data stored in the superblock SB5 is regarded as overflow data. The controller 4 writes the overflow data into the new overflow superblock SB10. The controller 4 then stores, into the overflow management table 65, the correspondence relationship between the information indicating the superblock SB8 and a physical address range from s to t indicating the storage area where the overflow data is written.

The controller 4 writes the RUH4 data stored in the superblock SB4, into the superblock SB9. The controller 4 then writes part of the RUH4 data stored in the superblock SB5, into the remaining storage area of the superblock SB9. That is, the RUH4 data stored in the superblock SB4 and the part of the RUH4 data stored in the overflow superblock SB5 are transferred to the superblock SB9. Thus, the superblock SB9 becomes a superblock that stores only the RUH4 data. Since the transfer destination superblock SB9 includes a defective area, the remaining RUH4 data stored in the superblock SB5 is regarded as overflow data. The controller 4 writes the overflow data into the new overflow superblock SB10. The controller 4 then stores, into the overflow management table 65, the correspondence relationship between the information indicating the superblock SB9 and a physical address range from t to u indicating the storage area where the overflow data is written.

The superblock SB10 is the new overflow superblock, and becomes a superblock that stores the RUH2 data, the RUH3 data, and the RUH4 data. The controller 4 stores the remaining RUH2 data, the remaining RUH3 data, and the remaining RUH4 data, which are stored in the superblock SB5, into the superblock SB10 as the refresh destination. Specifically, data that overflowed from the superblock SB7 is stored in the storage area indicated by the physical address range from r to s. Data that overflowed from the superblock SB8 is stored in the storage area indicated by the physical address range from s to t. Data that overflowed from the superblock SB9 is stored in the storage area indicated by the physical address range from t to u.

As described above, in the refresh process in the SSD 3 according to the embodiment, the controller 4 writes data having the same size as the writable area of a transfer destination superblock in the data belonging to a first RU stored in the refresh target superblock and the data belonging to the first RU stored in the overflow superblock, into the transfer destination superblock. When there is remaining data not written into the transfer destination superblock, the controller 4 writes the remaining data into the new overflow superblock.

Subsequently, a case where the RUH2 data is invalidated is assumed. For example, the host 2 transmits a trim command designating the RUH2 data to the SSD 3, thereby invalidating the RUH2 data.

Part (c) of FIG. 14 shows a state where the RUH2 data is invalidated. By invalidating the RUH2 data, the superblock SB7 that stores only the RUH2 data as shown in part (b) of FIG. 14 becomes a superblock that stores only an invalid data item. The superblock SB10 having stored the RUH2 data as shown in part (b) of FIG. 14 becomes a superblock that stores an invalid data item as shown in part (c) of FIG. 14.

In other words, the superblock SB7 is registered, as a free block that stores only the invalid data item, in the free block list 64. Execution of the data erase process allows new data to be written in the superblock SB7 again. That is, the superblock SB7 is a reusable superblock.

Since the superblock SB10 stores overflow data other than that of the RUH2 data, this superblock becomes a superblock that stores valid data items and the invalid data item. Accordingly, the superblock SB10 does not yet serve as a reusable superblock.

Next, a garbage collection (GC) process executed in the present embodiment is described. By referring to FIGS. 15 and 16, two types of GC processes executed in the SSD 3 according to the embodiment are described.

Figure 15:
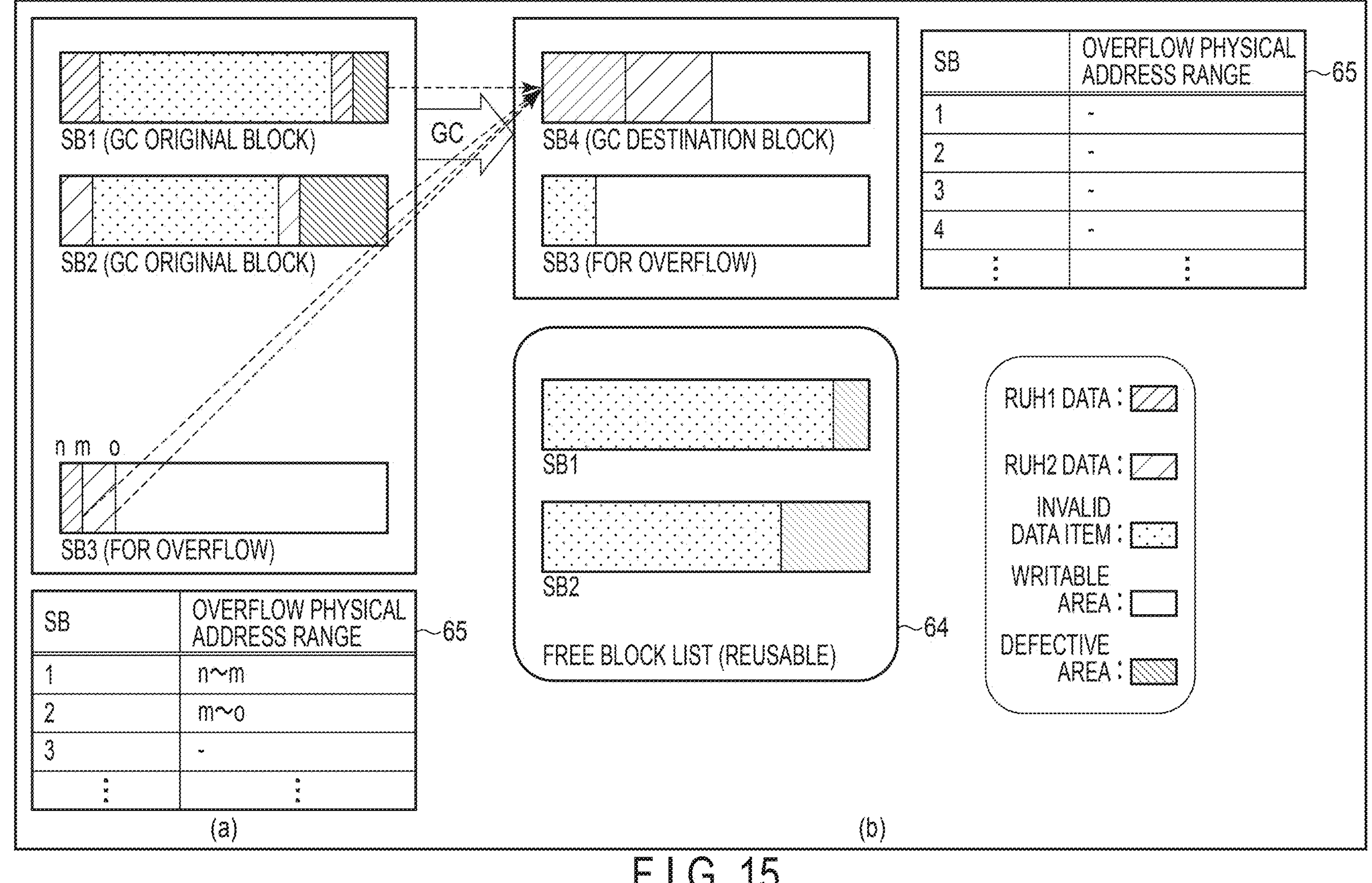
FIG. 15 shows a first example of a garbage collection process executed in the memory system according to the embodiment.

First, by referring to FIG. 15, the GC process according to a first method is described. FIG. 15 shows a first example of the garbage collection process executed in the memory system according to the embodiment.

Part (a) of FIG. 15 shows a state before execution of the GC process. Here, a case is assumed where the host 2 performs overwriting of data into an LBA range corresponding to part of data belonging to a certain RU, or invalidation of this range by the trim command. Note that it is conceivable that if the host 2 properly conforms to the FDP, such a case does not occur.

The superblock SB1 stores RUH1 data and an invalid data item. The superblock SB2 stores RUH2 data and an invalid data item. The superblock SB3 stores RUH1 data and RUH2 data.

The superblock SB1 is a write destination superblock for RUH1. Part of the RUH1 data in the superblock SB1 becomes an invalid data item by the overwriting or invalidation. The overflow data in the superblock SB1 is stored in a storage area indicated by a physical address range from n to m in the superblock SB3.

The superblock SB2 is a write destination superblock for RUH2. Part of the RUH2 data in the superblock SB2 becomes an invalid data item by the overwriting or invalidation. The overflow data in the superblock SB2 is stored in a storage area indicated by a physical address range from m to o in the superblock SB3.

Subsequently, the controller 4 executes the GC process.

In the GC process according to the first method, the controller 4 executes data copying such that data items belonging to the same RU are continuous across physical addresses in the GC destination superblock.

Part (b) of FIG. 15 shows a state after execution of the GC process according to the first method. In this GC process, the controller 4 selects the superblocks SB1 and SB2 as GC source superblocks. The controller 4 selects the superblock SB4 as the GC destination superblock, from the free block list 64. The controller 4 registers the selected superblock SB4 in the active block list 63.

The controller 4 copies the RUH1 valid data item stored in the superblock SB1, and the RUH1 valid data stored in the superblock SB3, to the superblock SB4. Furthermore, as an available storage area is present in the GC destination superblock SB4, the controller 4 copies the valid RUH2 data item stored in the superblock SB2, and the valid RUH2 data item stored in the superblock SB3, to the superblock SB4.

By the GC process, the superblocks SB1 and SB2 become free blocks that store no valid data item. The controller 4 updates the overflow management table 65, and removes information on the physical address ranges of the overflow data corresponding to the superblocks SB1 and SB2.

Both the RUH1 data and the RUH2 data stored in the overflow superblock SB3 become invalid data items. Since the superblock SB3 is the overflow superblock that includes an available storage area where data can be written, other overflow data can be additionally written therein. In a case where the overflow superblock is also used as a write destination superblock for data associated with a normal write command, the controller 4, in response to receipt of the normal write command, writes the data associated with the received normal write command into the available storage area of the superblock SB3. That is, the controller 4 maintains the superblock SB3 as an overflow superblock.

Next, a GC process according to a second method is described. FIG. 16 shows a second example of the garbage collection process executed in the SSD 3 according to the embodiment.

A state shown in part (a) of FIG. 16 is the same as the state before execution of the GC process described with reference to part (a) of FIG. 15.

In the GC process according to the second method, the valid data items stored in the GC source superblocks are copied to the overflow superblock.

Part (b) of FIG. 16 shows a state after execution of the GC process according to the second method. In the GC process according to the second method, similar to the GC process according to the first method, the controller 4 selects the superblocks SB1 and SB2 as the GC source superblocks. The controller 4 selects the superblock SB3 that is an overflow superblock, as the GC destination superblock.

AS shown in part (b) of FIG. 16, the controller 4 copies the valid data items from the GC source superblocks SB1 and SB2 to the overflow superblock SB3. Specifically, the controller 4 reads the RUH1 valid data item stored in the superblock SB1. The controller 4 writes the read valid data item into the available storage area of the superblock SB3. The controller 4 reads the RUH2 valid data item stored in the superblock SB2. The controller 4 writes the read valid data item into the superblock SB3.

Thus, both the RUH1 data and the RUH2 data are stored only in the superblock SB3. Accordingly, the controller 4 removes information related to the superblocks SB1 and SB2 in the overflow management table 65.

According to the GC process in the present embodiment, in each of cases of using the first method and the second method, the superblocks SB1 and SB2 become free blocks. The RUH1 data and the RUH2 data are stored in the GC destination superblock.

Next, procedures of the write process are described.

Figure 17:
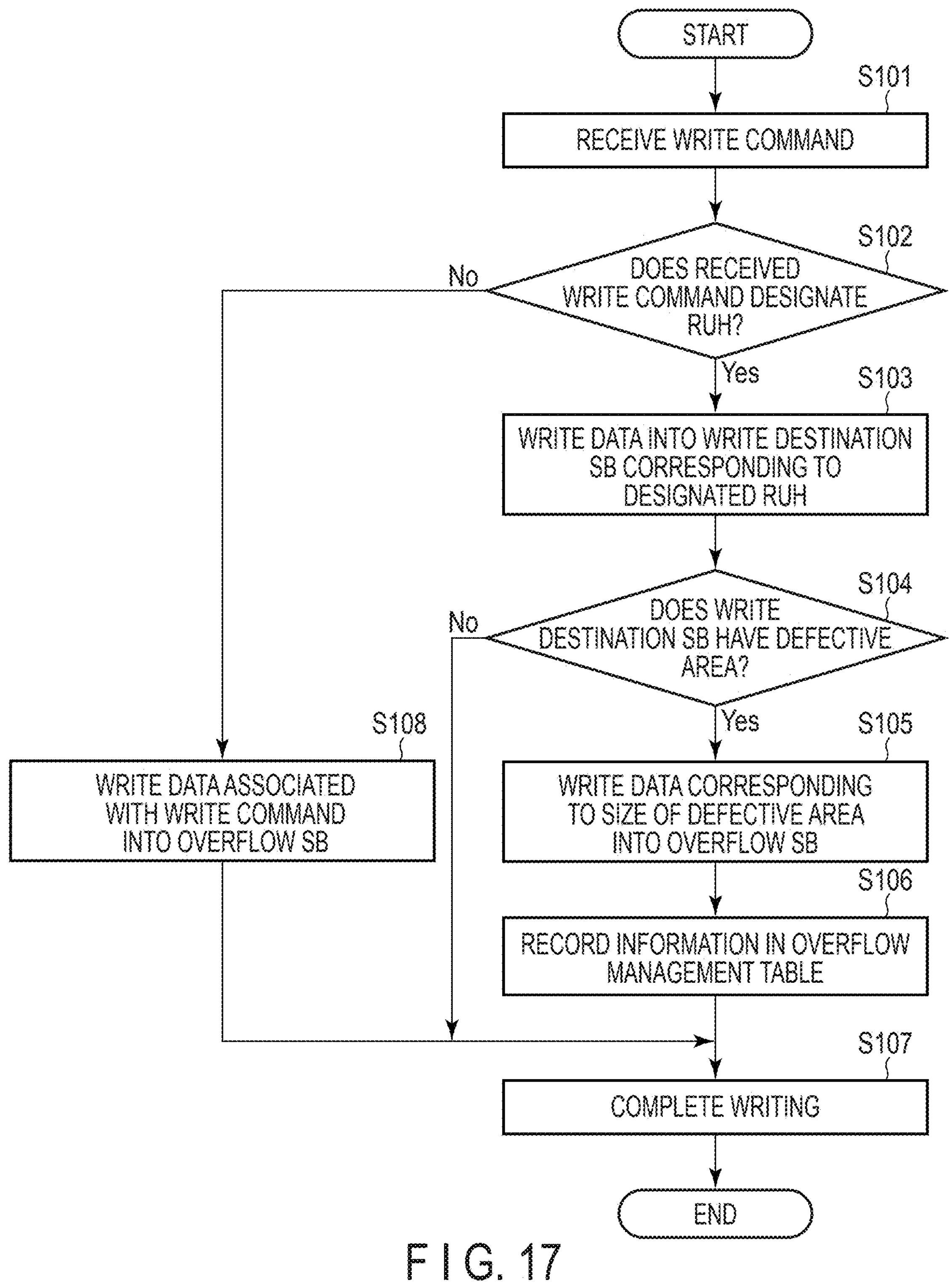
FIG. 17 is a flowchart showing procedures of a write process executed in the memory system according to the embodiment.

FIG. 17 is a flowchart showing procedures of the write process executed in the SSD 3 according to the embodiment.

First, the controller 4 of the SSD 3 receives a write command from the host 2 (S101). In response to receipt of the write command, the controller 4 starts the write process.

The controller 4 determines whether the write command received in step S101 is a write command designating a RUH or not (S102). That is, the controller 4 determines whether the write command received in step S101 is a write command for a request for writing data conforming to the FDP or not.

If the received write command is a write command designating a RUH (Yes in S102), the controller 4 starts the write process conforming to the FDP. It is herein assumed that the write command designating the RUH is a command for a request for writing data having the RU size. The controller 4 writes data associated with the write command, into a write destination superblock corresponding to the designated RUH (S103).

The controller 4 determines whether the write destination superblock in step S103 has a defective area or not (S104). That is, the controller 4 determines whether the write destination superblock can store the entire data having the RU size or not.

If the write destination superblock has a defective area (Yes in S104), the controller 4 writes data that could not be written in the write destination superblock because of the defective area (hereinafter referred to as "data corresponding to size of defective area"), into the overflow superblock (S105).

The controller 4 records information related to the data written in step S105, in the overflow management table 65 (S106). In the overflow management table 65, information indicating the write destination superblock is associated with a physical address range indicating the storage area where the overflow data is written in step S105.

The controller 4 completes the write process, and transmits a completion response corresponding to the write command received in step S101, to the host 2 (S107).

If the write destination superblock does not have any defective area (No in S104), in step S107, the controller 4 completes the write process, and transmits a completion response corresponding to the write command received in step S101. Here, the write destination superblock stores the entire data having the RU size.

If the write command received in step S101 is not a write command designating a RUH (No in S102), the controller 4 writes data associated with the received write command, into the overflow superblock (S108).

The controller 4 then completes the write process, and transmits a completion response corresponding to the write command received in step S101, to the host 2 (S107).

Next, the refresh process is described.

FIG. 18 is a flowchart showing procedures of the refresh process executed in the SSD 3 according to the embodiment.

First, the controller 4 of the SSD 3 selects a refresh target superblock (S201).

In step S202, the controller 4 refers to the overflow management table 65 with respect to the refresh target superblock selected in step S201.

The controller 4 determines whether there is overflow data corresponding to the refresh target superblock selected in step S201 or not (S203). For example, the controller 4 determines whether or not a physical address range indicating a storage area storing overflow data corresponding to the refresh target superblock selected in step S201 is included in the overflow management table 65 referred to in step S202.

If there is overflow data (Yes in S203), the controller 4 writes data stored in the refresh target superblock, and the overflow data belonging to the same RU as the data concerned, into the transfer destination superblock (S204).

If there is no overflow data (No in S203), the controller 4 writes the data stored in the refresh target superblock, into the transfer destination superblock (S205).

The controller 4 determines whether the transfer destination superblock has a defective area or not (S206). That is, the controller 4 determines whether the transfer destination superblock can store the entire data having the RU size or not.

If the transfer destination superblock has a defective area (Yes in S206), the controller 4 writes data corresponding to the size of the defective area, into the overflow superblock (S207). The controller 4 writes, into the overflow superblock, the remaining data having not been written into the transfer destination superblock owing to the defective area.

In step S208, the controller 4 records, in the overflow management table 65, information pertaining to the overflow data written in the overflow superblock in step S207. In the overflow management table 65, information indicating the transfer destination superblock is associated with a physical address range indicating the storage area where the overflow data is written in step S207.

If the transfer destination superblock has no defective area (No in S206), the controller 4 skips the processes of steps S207 and S208 because no overflow data occurs.

The controller 4 determines whether the refresh process has been completed or not (S209). The controller 4 determines whether there is another superblock required to be subjected to the refresh process or not.

If the refresh process has been completed (Yes in S209), the controller 4 finishes the refresh process.

If there is another superblock required to be subjected to the refresh process (No in S209), the controller 4 selects a refresh target superblock again (S201).

Next, the garbage collection process is described.

FIG. 19 is a flowchart showing procedures of the garbage collection process executed in the SSD 3 according to the embodiment. It is herein assumed that the GC process according to the first method is executed.

The controller 4 of the SSD 3 selects GC source superblocks (S301). For example, the controller 4 selects, as GC source superblocks, one or more superblocks having a low valid data ratio among the superblocks registered in the active block list 63.

In step S302, the controller 4 refers to the overflow management table 65 with respect to the GC source superblocks selected in step S301.

The controller 4 determines whether there is overflow data corresponding to the GC source superblocks selected in step S301 or not (S303). For example, the controller 4 determines whether or not a physical address range indicating a storage area where overflow data corresponding to the GC source superblocks selected in step S301 is included in the overflow management table 65 referred to in step S302.

If there is overflow data (Yes in S303), the controller 4 writes the data (i.e., the valid data items) stored in the GC source superblocks, and the overflow data belonging to the same RU as the data concerned, into the GC destination superblock (S304).

If the overflow data is not present (No in S303), the controller 4 writes the data (i.e., the valid data items) stored in the GC source superblocks, into the GC destination superblock (S305).

The GC destination superblocks in steps S304 and S305 may be, for example, superblocks newly selected from the free block list 64 or overflow superblocks.

The controller 4 determines whether the data items belonging to one RU are stored in one superblock or not (S306). That is, the controller 4 determines whether the overflow data occurs or not.

If the data items belonging to one RU are stored in one GC destination superblock (Yes in S306), that is, if no overflow data occurs, the controller 4 completes writing pertaining to the data stored in the GC source superblocks selected in step S301 (S307).

If the data items belonging to one RU are not stored solely in one GC destination superblock (No in S306), that is, if overflow data occurs, the controller 4 writes the overflow data into a new GC destination superblock (S308). The controller 4 writes a data item having not been written into the original GC destination superblock, into the new GC destination superblock.

The controller 4 records information related to the overflow data written in step S308, in the overflow management table 65 (S309).

In step S307, the controller 4 completes writing pertaining to the data stored in the GC source superblocks selected in step S301.

When the GC process according to the second method is executed, the controller 4 writes, into the overflow superblock, the valid data items stored in the GC source superblocks, irrespective of the result of the determination in step S303.

Accordingly, in the garbage collection process, the controller 4 associates the data stored in the GC source superblocks with the overflow data corresponding to the GC source superblocks, thus executing data copying.

As described above, according to the SSD 3 in the embodiment, the controller 4 sets the RU size to the maximum writable size of a superblock, and allocates any superblock as a write destination superblock in the data write process conforming to the FDP. When overflow data occurs, the controller 4 writes the overflow data into an overflow superblock.

Accordingly, the controller 4 can use the writable storage areas of the superblocks in the SSD 3 for the data write process conforming to the FDP without wasting the writable storage areas.

In the refresh process and the garbage collection process, the controller 4 associates the data stored in a target superblock with the overflow data corresponding to the target superblock, and copies them to a transfer destination superblock (or a GC destination superblock).

Accordingly, in data transfer, data items of multiple RUs can be prevented from being present in one superblock in a mixed manner.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system connectable to a host, the memory system comprising:
- a nonvolatile memory that includes a plurality of physical blocks each serving as a unit of a data erase operation; and
- a controller electrically connected to the nonvolatile memory and configured to:
  - manage a plurality of superblocks that each include one or more physical blocks among the plurality of physical blocks and include at least a first superblock and a second superblock;
  - notify the host of a maximum size among data sizes writable in each of the plurality of superblocks, as a first size that is a size of a reclaim unit (RU); and
  - upon receipt of one or more write commands from the host, the one or more write commands designating a first reclaim unit having the first size, write a first data portion of the first reclaim unit into the first superblock to fill the entire first superblock and then a second data portion of the first reclaim unit into the second superblock.

2. The memory system of claim 1, wherein the controller is configured to write, into the second superblock, the second data portion of the first reclaim unit and a data portion of a second reclaim unit designated in one or more other write commands received from the host.

3. The memory system of claim 1, wherein the controller is configured to write, into the second superblock, the second data portion of the first reclaim unit and data designated in one or more other write commands received from the host that are not associated with a reclaim unit.

4. The memory system of claim 1, wherein the plurality of superblocks further include a third superblock and a fourth superblock, and the controller is further configured to, in a first process for the first superblock, write the first and second data portions of the first reclaim unit into the third superblock to fill the entire third superblock and then into the fourth superblock.

5. The memory system of claim 4, wherein the controller is further configured to read the first data portion of the first reclaim unit from the first superblock and the second data portion of the first reclaim unit from the second superblock prior to writing the first and second data portions of the first reclaim unit into the third superblock and the fourth superblock.

6. The memory system of claim 1, wherein the first superblock has one or more defective blocks, the plurality of superblocks further include a third superblock that has no defective blocks, and the controller is further configured to, in a first process for the first superblock, write the first and second data portions of the first reclaim unit entirely into the third superblock.

7. The memory system of claim 1, wherein the plurality of superblocks further include a third superblock, and the controller is further configured to, in a second process for the first superblock, write, into the third superblock, only a valid data item among data items that belong to the first reclaim unit and are stored in the first superblock, and only a valid data item among data items that belong to the first reclaim unit and are stored in the second superblock.

8. The memory system of claim 1, wherein the controller is further configured to, in a second process for the first superblock, write only a valid data item among the data items that belong to the first reclaim unit and are stored in the first superblock, into the second superblock that already stores a valid data item among the data items that belong to the first reclaim unit.

9. The memory system of claim 1, wherein a data item belonging to a single RU is associated with a plurality of logical block addresses (LBA).

10. The memory system of claim 9, wherein the controller is further configured to, upon receipt of a write command from the host, the write command not designating a write destination RU, write, into the second superblock, a data item associated with the write command that does not designate the write destination RU.

11. The memory system of claim 1, wherein the controller is further configured to, when writing the second data portion of the first reclaim unit into the second superblock, store, in a first table, a correspondence relationship between the first superblock and a physical address range that indicates a storage region in the second superblock in which the second data portion of the first reclaim unit is written.

12. The memory system of claim 11, wherein the plurality of superblocks further include a third superblock and a fourth superblock, and the controller is further configured to, in a first process for the first superblock: write the first and second data portions of the first reclaim unit into the third superblock to fill the entire third superblock and then into the fourth superblock; and store, in the first table, a correspondence relationship between the third superblock and a physical address range that indicates a storage region in the fourth superblock in which a data portion of the first reclaim unit is written.

13. The memory system of claim 11, wherein the plurality of superblocks further include a third superblock and a fourth superblock, and the controller is further configured to write valid data items of the first and second data portions of the first reclaim unit into the third superblock to fill the entire third superblock and then into the fourth superblock.

14. The memory system of claim 1, wherein the controller is further configured to, upon receipt of a first request designating the first reclaim unit from the host, notify the host of a difference between the first size and an aggregate size of the first data portion and the second data portion.

15. A method of managing writes in a memory system that includes a nonvolatile memory that includes a plurality of physical blocks each serving as a unit of a data erase operation, said method comprising:

grouping the physical blocks into a plurality of superblocks, each of which includes one or more of the physical blocks, the superblocks including at least a first superblock and a second superblock;

setting a first size that is a size of a reclaim unit (RU) to a maximum size among data sizes writable in each of the plurality of superblocks;

notifying a host connected to the memory system of the set first size;

receiving one or more write commands that designate a first reclaim unit having the first size, from the host; and writing a first data portion of the first reclaim unit into the first superblock to fill the entire first superblock and then a second data portion of the first reclaim unit into the second superblock.

16. The method of claim 15, further comprising: writing, into the second superblock, the second data portion of the first reclaim unit and a data portion of a second reclaim unit designated in one or more other write commands received from the host.

17. The method of claim 15, further comprising: writing, into the second superblock, the second data portion of the first reclaim unit and data designated in one or more other write commands received from the host that are not associated with a reclaim unit.

18. The method of claim 15, wherein the plurality of superblocks further include a third superblock and a fourth superblock, and the method further comprises:

in a first process for the first superblock, writing the first and second data portions of the first reclaim unit into the third superblock to fill the entire third superblock and then into the fourth superblock.

19. The method of claim 15, wherein the plurality of superblocks further include a third superblock, and the method further comprises:

in a first process for the first superblock, write the first and second data portions of the first reclaim unit entirely into the third superblock, wherein the first superblock has one or more defective blocks and the third superblock has no defective blocks.

20. The method of claim 15, wherein the plurality of superblocks further include a third superblock, and the method further comprises:

in a second process for the first superblock, writing, into the third superblock, only a valid data item among data items that belong to the first reclaim unit and are stored in the first superblock, and only a valid data item among data items that belong to the first reclaim unit and are stored in the second superblock.

* * * * *